United States Patent
Wiener et al.

(10) Patent No.: US 10,733,087 B2
(45) Date of Patent: Aug. 4, 2020

(54) ENVIRONMENT FOR CONTINUOUS TESTING AND INTEGRATION OF SOFTWARE

(71) Applicant: ServiceNow, Inc., Santa Clara, CA (US)

(72) Inventors: David Joshua Wiener, Ramat Biet Shemesh (IL); Yaron Hecker, Tel Aviv (IL); Nir Yariv, Kfar Sava (IL)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/163,142

(22) Filed: Oct. 17, 2018

(65) Prior Publication Data

US 2020/0125485 A1   Apr. 23, 2020

(51) Int. Cl.
*G06F 9/44* (2018.01)
*G06F 11/36* (2006.01)
*G06F 11/34* (2006.01)
*G06F 8/71* (2018.01)

(52) U.S. Cl.
CPC .......... *G06F 11/3688* (2013.01); *G06F 8/71* (2013.01); *G06F 11/3466* (2013.01); *G06F 11/3664* (2013.01)

(58) Field of Classification Search
CPC .... G06F 8/71; G06F 11/3466; G06F 11/3664; G06F 11/3688
USPC .................................................. 717/124–133
See application file for complete search history.

(56) References Cited

U.S. PATENT DOCUMENTS

| 5,999,908 | A  | * | 12/1999 | Abelow | ............. | G06Q 10/0639 |
|---|---|---|---|---|---|---|
| | | | | | | 705/7.32 |
| 7,620,565 | B2 | * | 11/2009 | Abelow | ............... | G06Q 10/101 |
| | | | | | | 705/500 |
| 8,490,046 | B2 | * | 7/2013 | Bhinge | ................. | G06F 11/263 |
| | | | | | | 716/100 |
| 8,583,414 | B1 | | 11/2013 | Aldrich et al. | | |
| 8,732,693 | B2 | * | 5/2014 | Mutisya | ............... | G06F 11/3688 |
| | | | | | | 717/168 |
| 9,389,986 | B2 | | 7/2016 | Mathew et al. | | |

(Continued)

OTHER PUBLICATIONS

Gabriel Ruiz et al., "D4.1 Guidelines for the structure of the overall development framework", 2017, Hotmaps, 60 pages (Year: 2017).*

*Primary Examiner* — Ted T. Vo
(74) *Attorney, Agent, or Firm* — Fletcher Yoder PC

(57) ABSTRACT

A computing system may include a software application configured to receive instructions to merge a source code update with a branch of a software product, provide instructions to merge the source code update into the branch, and select software tests to execute on the branch as updated based on a portion of the branch modified by the source code update and a predetermined checkpoint within a development cycle of the software product. The software application may also be configured to provide instructions to execute the software tests on the branch as updated and receive feedback data indicating results of the software tests. The software application may be additionally configured to determine that the feedback data indicates that the branch as updated passed at least a threshold number of the software tests, and, in response, provide instructions to merge the branch as updated with a production branch of the software product.

20 Claims, 16 Drawing Sheets

(56) References Cited

U.S. PATENT DOCUMENTS 9,652,509 B2 * 5/2017 Shani .................. G06F 11/3688
2016/0328314 A1 11/2016 Yadava et al.

* cited by examiner

| TEST 600 | | | | | |
|---|---|---|---|---|---|
| | INSTRUCTIONS | BRANCHES | LINES | METHODS | CLASSES |
| CODE UNIT 606 | 100% | 100% | 100% | 100% | 100% |
| CODE UNIT 608 | 25% | 50% | 30% | 50% | 75% |
| CODE UNIT 610 | 0% | 0% | 0% | 0% | 0% |
| CODE UNIT 612 | 0% | 0% | 0% | 0% | 0% |
| CODE UNIT 616 | 90% | 80% | 75% | 100% | 100% |
| CODE UNIT 618 | 0% | 0% | 0% | 0% | 0% |
| CODE UNIT 620 | 55% | 50% | 60% | 90% | 90% |
| CODE UNIT 622 | 80% | 75% | 85% | 75% | 80% |

FIG. 6B

| TEST 600 | | |
|---|---|---|
| | DATA VALUES | TABLE STRUCTURES |
| DATA UNIT 614 | 2% | 0% |
| DATA UNIT 624 | 0% | 0% |
| DATA UNIT 626 | 0% | 0% |

FIG. 6C

| | CODE UNIT 606 | CODE UNIT 608 | CODE UNIT 610 | CODE UNIT 612 | CODE UNIT 616 | CODE UNIT 618 | CODE UNIT 620 | CODE UNIT 622 |
|---|---|---|---|---|---|---|---|---|
| TEST 600 | X | X | | | | | X | X |
| TEST 602 | | | X | | X | | | |
| TEST 604 | | | X | X | X | X | | |

% COVERAGE INSTRUCTIONS: 75
...
% COVERAGE CLASSES: 90
MEMORY USAGE: 206,032 K
EXECUTION TIME: 5 SEC

FIG. 6D

| | DATA UNIT 614 | DATA UNIT 624 | DATA UNIT 626 |
|---|---|---|---|
| TEST 600 | X | | |
| TEST 602 | | X | |
| TEST 604 | | X | X |

DATA VALUES ACCESSED: 5
DATA VALUES MODIFIED: 3
TABLES ACCESSED: 2
TABLES MODIFIED: 1

FIG. 6E

ENVIRONMENT FOR CONTINUOUS TESTING AND INTEGRATION OF SOFTWARE

BACKGROUND

Computer software products are typically tested before being released to end users. A software product may be tested by having a software test provide one or more inputs to the software product and observing how the software product behaves. For instance, the software tests may check that, for each input, the software product produces a desired or expected output. The software testing process may involve coordination between a plurality of different systems and devices, such as content management systems used to keep track of modifications made to the software product by different programmers and a testing server used to execute the software tests on different versions of the software product. In some cases, these systems may be provided by different service providers and/or hosted on different computing systems and may thus involve additional time and effort to coordinate with one another.

SUMMARY

A software development application is provided that centralizes control over a plurality of systems used during development of a software product. The systems used during software development may involve a content management system and a testing server (which may include as part thereof a build server). The software application is communicatively connected with each of these systems and is configured to synchronize and coordinate the operations thereof to facilitate development of the software product. Namely, the software application is configured to deploy tasks to each of these systems, track the progress of the deployed tasks, provide feedback regarding the status of the deployed tasks, and, based on results of the tasks, automatically deploy subsequent tasks to keep a source code update progressing through the development cycle of the software product. The tasks may involve, for example, merging of source code updates with different versions, or branches, of the software product, resolving conflicts between the source code updates and source code contained in the different versions, building of the software product to generate executable files that implement the source code updates, and testing of the built software product.

The development cycle of the software product may be divided into a plurality of checkpoints, each associated with corresponding processes, parameters, and rules that, when carried out, result in implementation and verification of a source code update as part of a releasable version of the software product. An example software development cycle may include a push checkpoint, a staging checkpoint, a production checkpoint, and a release checkpoint. The software application may be used to define these checkpoints and their corresponding properties to tailor the software application to the software development practices and methodologies utilized by a software development team.

Namely, each checkpoint may be mapped to a corresponding branch that represents a version of the software product in a version control system of the content management system. Each checkpoint may also be mapped to a corresponding group, class, or type of tests used to evaluate a source code update at a given checkpoint of the development cycle. Further, each checkpoint may be mapped to a computing environment in which the software product (containing the source code update) is to be executed and tested at the given checkpoint. Yet further, each checkpoint may be associated with various threshold metrics or values for the software tests that determine whether, based on the results of the software tests at the given checkpoint, the source code update will progress to a subsequent checkpoint within the development cycle.

Using such properties and mappings, the software application may automate the progression of a source code update through the development cycle. A developer may generate a source code update that, for example, implements a new feature or improves an existing feature within the software product. This source code update may be generated, for example, within a local copy of a particular branch, or version, of the software product. By requesting to merge the source code update with a remote copy of the particular branch (corresponding to a particular checkpoint) stored on the content management system, the software application may be configured to automatically take the source code update through the development cycle or a portion thereof.

Specifically, the software application may transmit a request to merge the source code update (contained in the local copy of the particular branch) with the particular branch stored on the content management system. When the source code update is successfully merged with the first branch, the software application may identify portions of the software product to rebuild to implement the source code update as part of an executable file of the software product, as well as the order in which to execute the rebuild. Additionally, based on the checkpoint to which the particular branch is mapped, the software application may select software tests to execute on the updated software product and a computing environment in which to execute the tests.

In selecting the portions of the software product to rebuild, the software tests, and the computing environment, the software application may rely on a mapping of dependencies among code units and data units of the software product. The mapping of dependencies may include, for a plurality of different software tests, (i) the code units and data units invoked, directly or indirectly, by a particular test, (ii) the order in which the code units and data units are invoked by the particular test, and (iii) a plurality of performance parameters indicating resources used in executing the particular test, among other data. Thus, the software application may, for example, determine to rebuild code units or data units modified by the source code update, select tests that invoke the code units or data units modified by the source code update, and select a computing environment that provides the resources (e.g., libraries) needed to execute the code units and data units that will be invoked by the selected tests.

Additionally, the software application may be configured to improve the selection of software tests based on the performance parameters associated with a particular test. Namely, target performance parameters may be defined for each checkpoint or for a particular round of testing. The target performance parameters may indicate a target test execution time, a target code coverage of the software product, a target extent of resources (e.g., memory, processor cores, etc.) to be used in testing, and a target extent of parallelizability to be employed in execution of the selected software tests, among other target performance parameters. The software application may be configured to select a group of software tests that adhere to the target performance parameters, thus improving the amount of information gained regarding the quality of the source code update per unit of resources (e.g., time, energy, etc.) expanded to gain this information.

With the build parameters, software tests, and computing environment selected, the software application may be configured to dispatch appropriate tasks to the testing server to build and test the updated software product. The software application may also receive feedback regarding each task and, based thereon, determine to dispatch further tasks or request review or input from the developer regarding any encountered errors or warnings. For example, when the particular branch containing the source code update passes at least a threshold number of the software tests, the source code update may be advanced to a subsequent checkpoint within the development cycle.

The software application may be configured to automatically carry out a similar process according to the mappings and parameters associated with the subsequent checkpoint. Namely, the particular branch (e.g., development branch) which now contains the source code update may be requested to be merged into another branch (e.g., staging branch) corresponding to the subsequent checkpoint. In some cases, the request to merge branches may be automatically generated by the software application. Alternatively, at some checkpoints, this request may be manually generated by the developer. The software application may determine the software build order, testing environment, and software tests to be used to evaluate the other branch. As the software application progresses through the checkpoints, the extent of the software product to rebuild and the extent of testing may increase to evaluate progressively larger portions of the software product and validate operations of the source code update within the context of these larger portions.

The source code update may eventually be merged with a production branch of the software product representing a version of the software product that contains source code updates generated by multiple developers and validated to perform according to at least minimum acceptable performance metrics. The production branch may represent a most up-to-date version of the software product based on which subsequent branches are created to be used to generate additional source code updates. Thus, by frequently updating the production branch with successfully tested source code updates, developers may, while generating further source code updates, increase the probability of taking into account prior source code updates generated by other developers, thereby decreasing the probability of encountering source code conflicts when merging branches.

By automating the merge, build, and testing process in this fashion, the software application may decrease the amount of time spent on managing the progression of a source code update through the development cycle, allowing additional source code updates to be generated thereby more frequently. Notably, multiple different source code updates may be tested in parallel, with each source code update being evaluated according to the rules of a different checkpoint. Additionally, by taking into account the dependencies among tests, code units, and data units, the testing process is made more accurate while reducing the amount of resources expanded thereon. Overall, these efficiency gains allow for more frequent merges of source code updates with the production branch, thereby decreasing the probability of source conflicts and further reducing the time needed to develop a software product feature.

Accordingly, in a first example embodiment, a computing system may include a software application disposed on a computational instance of a remote network management platform. The software application is communicatively connected to (i) a testing server and (ii) a content management system. The software application is configured to receive instructions to merge a source code update with a first branch of a software product. The first branch corresponds to a predetermined checkpoint within a development cycle of the software product. The software application is also configured to provide, to the content management system, instructions to update the first branch by merging the source code update into the first branch. The software application is additionally configured to select a plurality of software tests to execute on the first branch as updated based on (i) a portion of the first branch modified by the source code update and (ii) the predetermined checkpoint within the development cycle. The software application is further configured to provide instructions to the testing server to execute the plurality of software tests on the first branch as updated and receive feedback data from the testing server indicating results of the plurality of software tests. The software application is yet further configured to determine that the feedback data indicates that the first branch as updated passed at least a threshold number of the plurality of software tests and, in response to determining that the feedback data indicates that the first branch as updated passed at least the threshold number of the plurality of software tests, provide, to the content management system, instructions to merge the first branch as updated with a production branch of the software product such that subsequent branches created from the production branch include the source code update.

In a second example embodiment, an article of manufacture may include a non-transitory computer-readable medium, having stored thereon program instructions that, upon execution by a computing system, cause the computing system to perform operations. The operations include receiving instructions to merge a source code update with a first branch of a software product. The first branch corresponds to a predetermined checkpoint within a development cycle of the software product. The operations also include providing, to a content management system communicatively connected to the computing system, instructions to update the first branch by merging the source code update into the first branch. The operations additionally include selecting a plurality of software tests to execute on the first branch as updated based on (i) a portion of the first branch modified by the source code update and (ii) the predetermined checkpoint within the development cycle. The operations further include providing, to a testing server communicatively connected to the computing system, instructions to execute the plurality of software tests on the first branch as updated and receiving feedback data from the testing server indicating results of the plurality of software tests. The operations yet further include determining that the feedback data indicates that the first branch as updated passed at least a threshold number of the plurality of software tests and, in response to determining that the feedback data indicates that the first branch as updated passed at least the threshold number of the plurality of software tests, providing, to the content management system, instructions to merge the first branch as updated with a production branch of the software product such that subsequent branches created from the production branch include the source code update.

In a third example embodiment a method is provided that includes receiving, by a software application disposed on a computational instance of a remote network management platform, instructions to merge a source code update with a first branch of a software product. The first branch corresponds to a predetermined checkpoint within a development cycle of the software product. The method also includes providing, by the software application and to a content management system communicatively connected to the software application, instructions to update the first branch by merging the source code update into the first branch. The method additionally includes selecting, by the software application, a plurality of software tests to execute on the first branch as updated based on (i) a portion of the first branch modified by the source code update and (ii) the predetermined checkpoint within the development cycle. The method further includes providing, by the software application and to a testing server communicatively connected to the software application, instructions to execute the plurality of software tests on the first branch as updated and receiving, by the software application, feedback data from the testing server indicating results of the plurality of software tests. The method yet further includes determining, by the software application, that the feedback data indicates that the first branch as updated passed at least a threshold number of the plurality of software tests and, in response to determining that the feedback data indicates that the first branch as updated passed at least the threshold number of the plurality of software tests, providing, by the software application and to the content management system, instructions to merge the first branch as updated with a production branch of the software product such that subsequent branches created from the production branch include the source code update.

In a fourth example embodiment, a computing system may include at least one processor, as well as memory and program instructions. The program instructions may be stored in the memory, and upon execution by the at least one processor, cause the computing system to perform operations. The operations include receiving instructions to merge a source code update with a first branch of a software product. The first branch corresponds to a predetermined checkpoint within a development cycle of the software product. The operations also include providing, to a content management system communicatively connected to the computing system, instructions to update the first branch by merging the source code update into the first branch. The operations additionally include selecting a plurality of software tests to execute on the first branch as updated based on (i) a portion of the first branch modified by the source code update and (ii) the predetermined checkpoint within the development cycle. The operations further include providing, to a testing server communicatively connected to the computing system, instructions to execute the plurality of software tests on the first branch as updated and receiving feedback data from the testing server indicating results of the plurality of software tests. The operations yet further include determining that the feedback data indicates that the first branch as updated passed at least a threshold number of the plurality of software tests and, in response to determining that the feedback data indicates that the first branch as updated passed at least the threshold number of the plurality of software tests, providing, to the content management system, instructions to merge the first branch as updated with a production branch of the software product such that subsequent branches created from the production branch include the source code update.

In a fifth example embodiment, a system is provided that includes means for receiving instructions to merge a source code update with a first branch of a software product. The first branch corresponds to a predetermined checkpoint within a development cycle of the software product. The system also includes means for providing, to a content management system communicatively connected to the system, instructions to update the first branch by merging the source code update into the first branch. The system additionally includes means for selecting a plurality of software tests to execute on the first branch as updated based on (i) a portion of the first branch modified by the source code update and (ii) the predetermined checkpoint within the development cycle. The system further includes means for providing, to a testing server communicatively connected to the system, instructions to execute the plurality of software tests on the first branch as updated and means for receiving feedback data from the testing server indicating results of the plurality of software tests. The system yet further includes means for determining that the feedback data indicates that the first branch as updated passed at least a threshold number of the plurality of software tests and means for, in response to determining that the feedback data indicates that the first branch as updated passed at least the threshold number of the plurality of software tests, providing, to the content management system, instructions to merge the first branch as updated with a production branch of the software product such that subsequent branches created from the production branch include the source code update.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6B illustrates code coverage of a software product, in accordance with example embodiments.

FIG. 6C illustrates database usage by a software product, in accordance with example embodiments.

FIG. 6D illustrates a mapping between software tests and code units, in accordance with example embodiments.

FIG. 6E illustrates a mapping between software tests and data units, in accordance with example embodiments.

DETAILED DESCRIPTION

Figure 1:
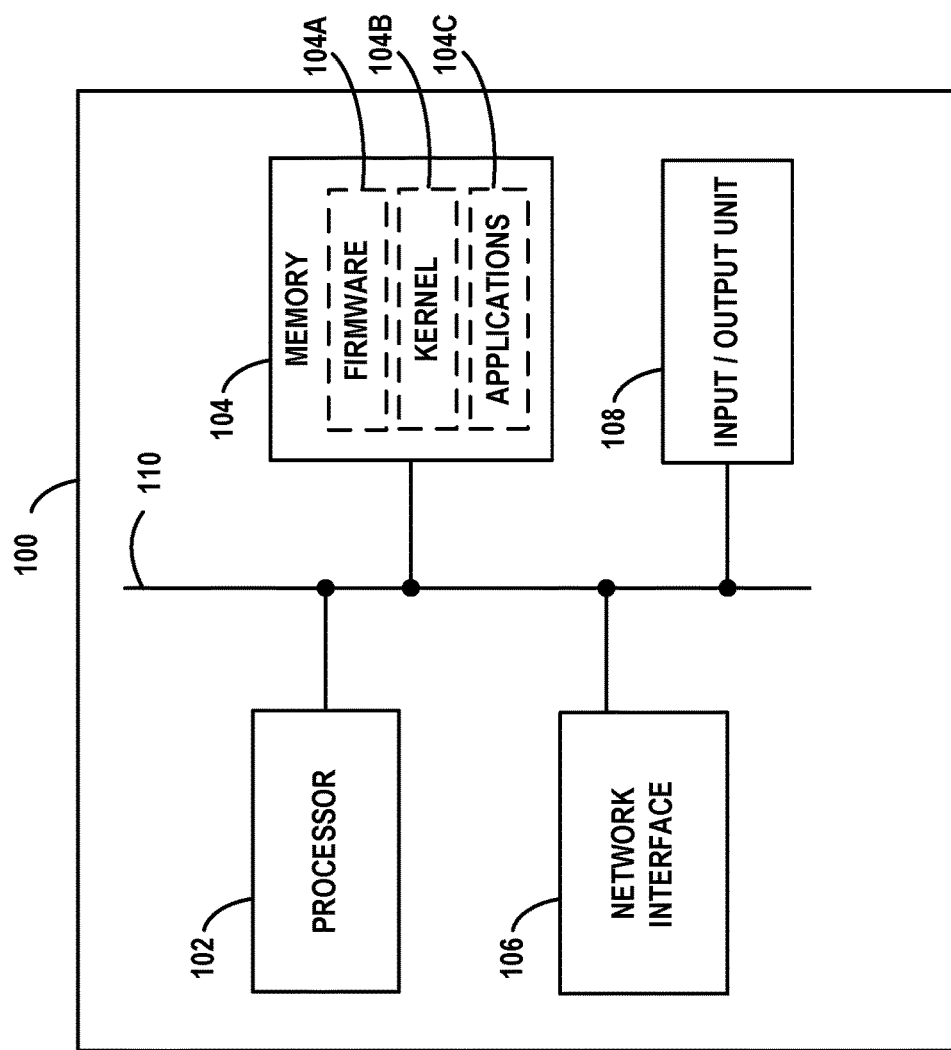
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of predefined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
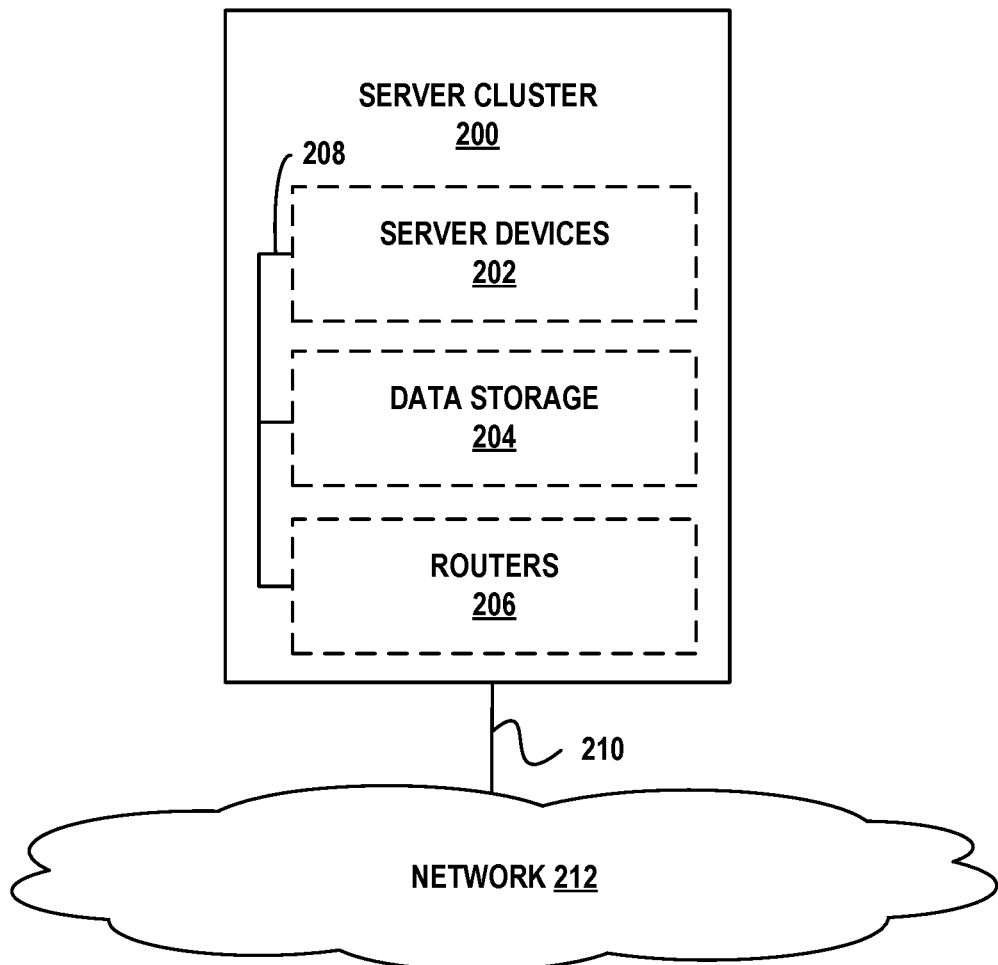
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
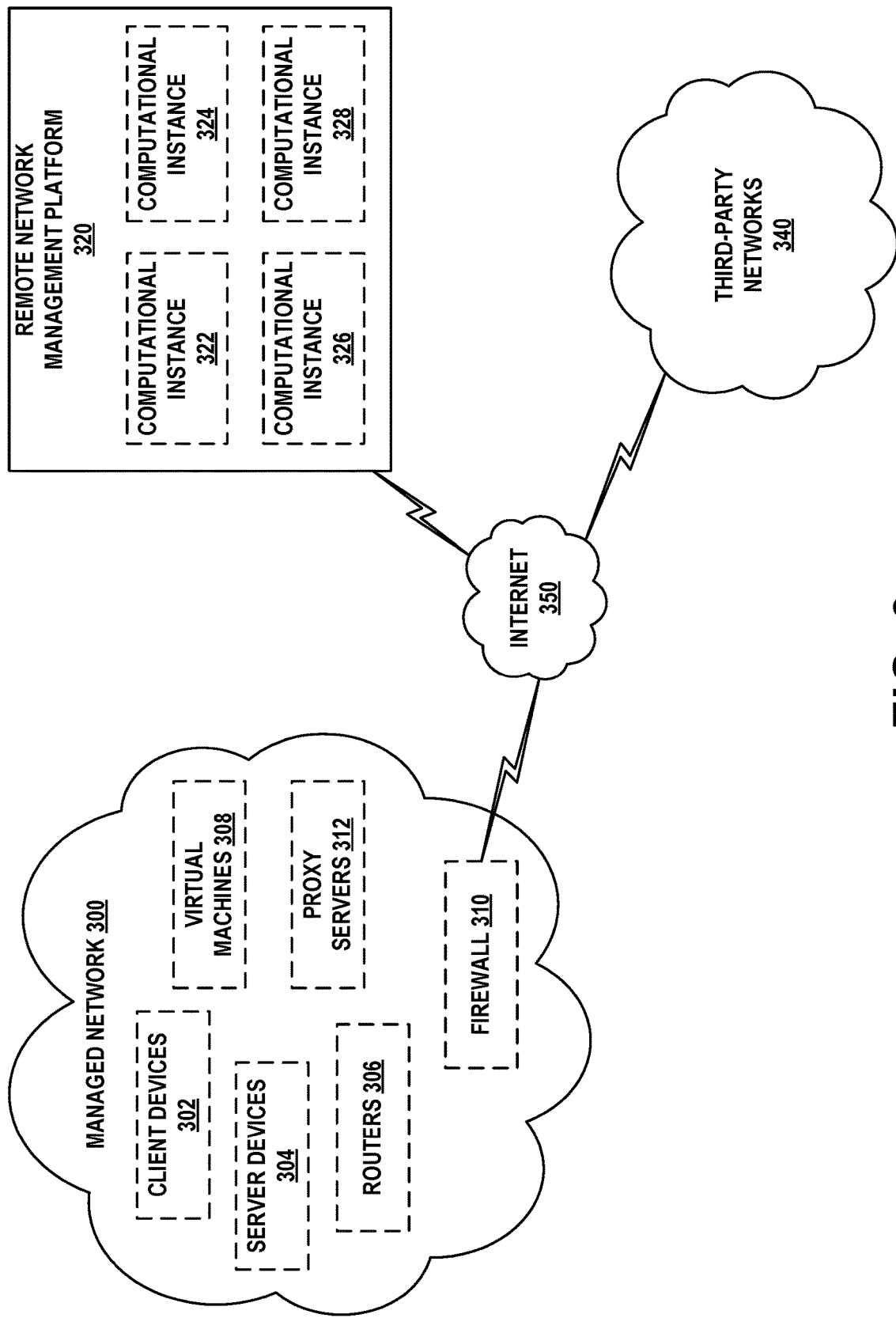
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
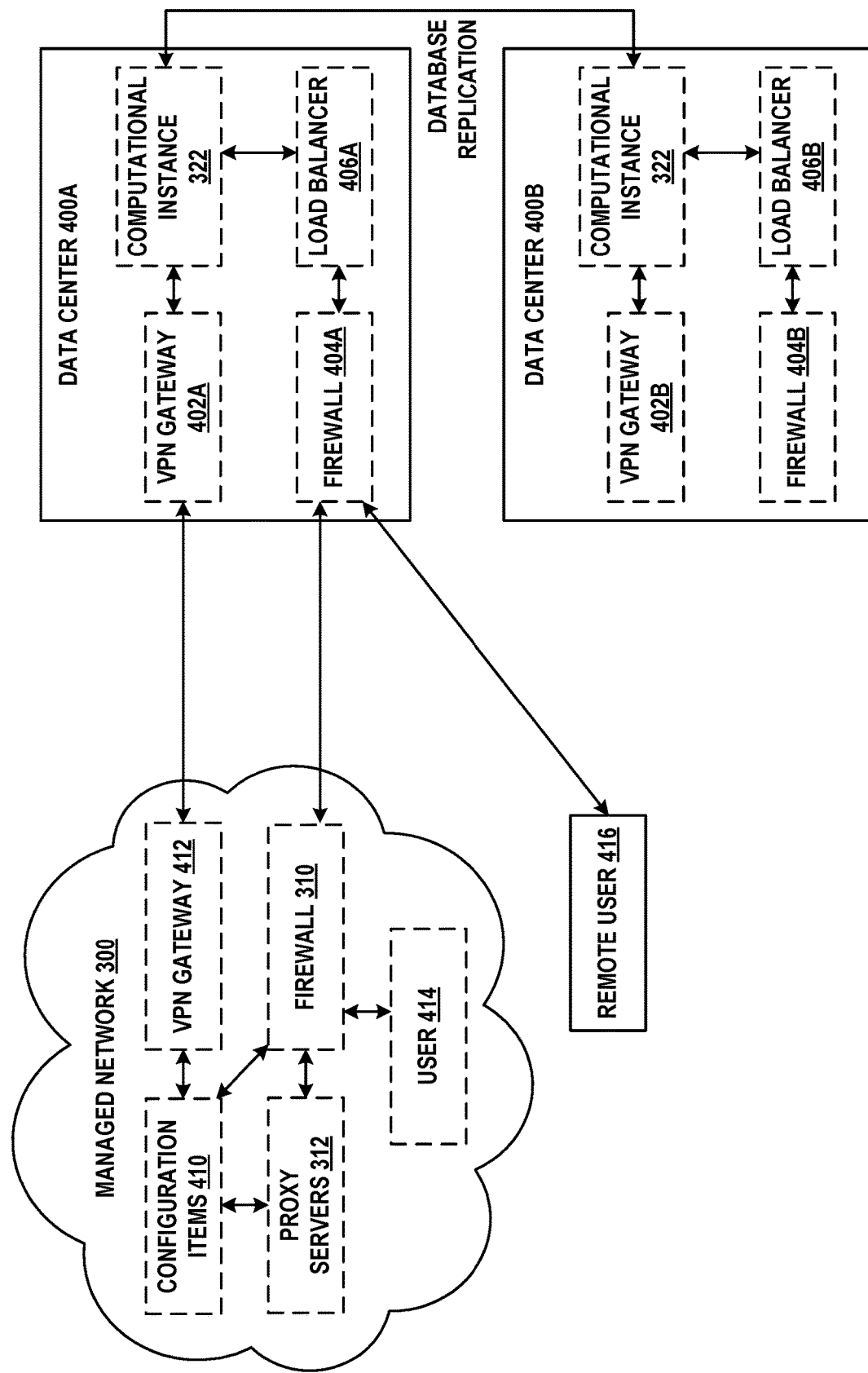
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
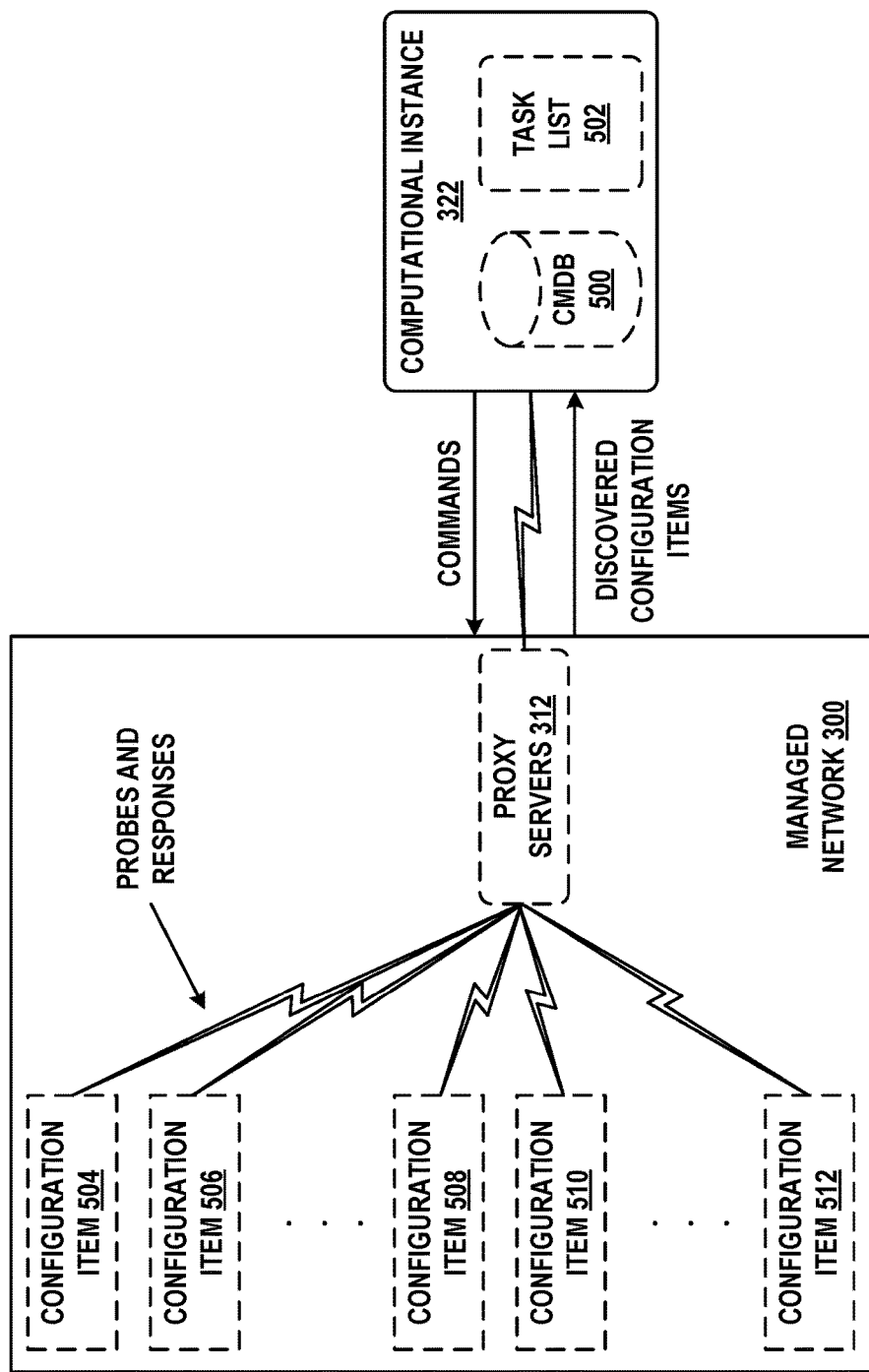
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
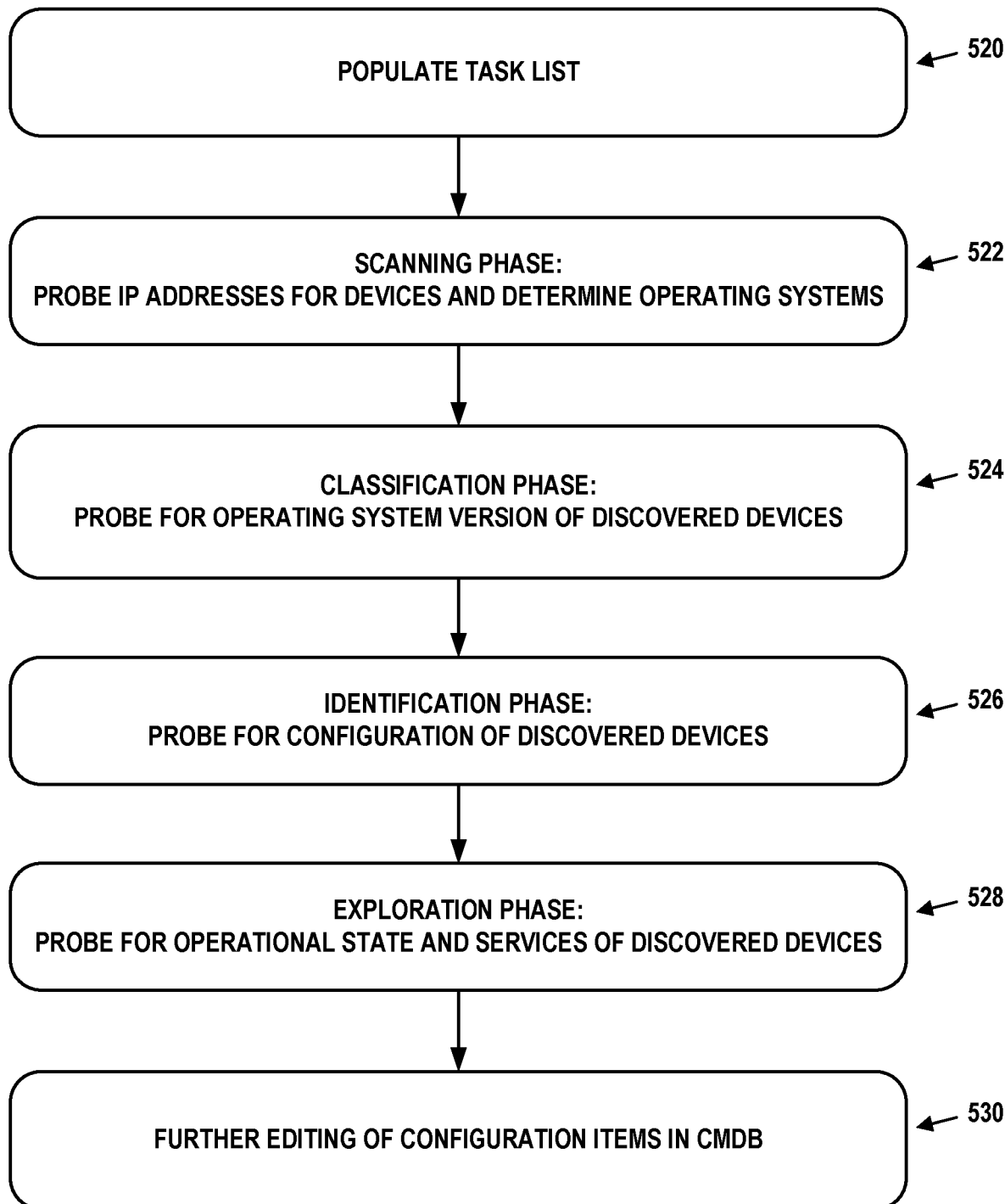
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example Mapping Between Code, Data, and Software Tests

A software development application or another component of a software testing system may be configured to systematically identify sets of software tests that evaluate modified code units and modified data units. The sets of software tests may be determined according to one or more sets of constraints such as test coverage, test runtime, computing resource usage, and test parallelizability, among other possibilities. Additionally, because modern software often relies on coordination between both code units and data units, the software development application system may map the interdependence between software tests and code units, as well as software tests and data units. By considering the impact of data units on the software product, errors may be identified not only in code units but also in (i) data units on which the code units depend for successful execution and (ii) additional code units that are stored in the database rather than being stored in files as part of the source code of the software product, among other possible sources of errors.

Figure 6A:
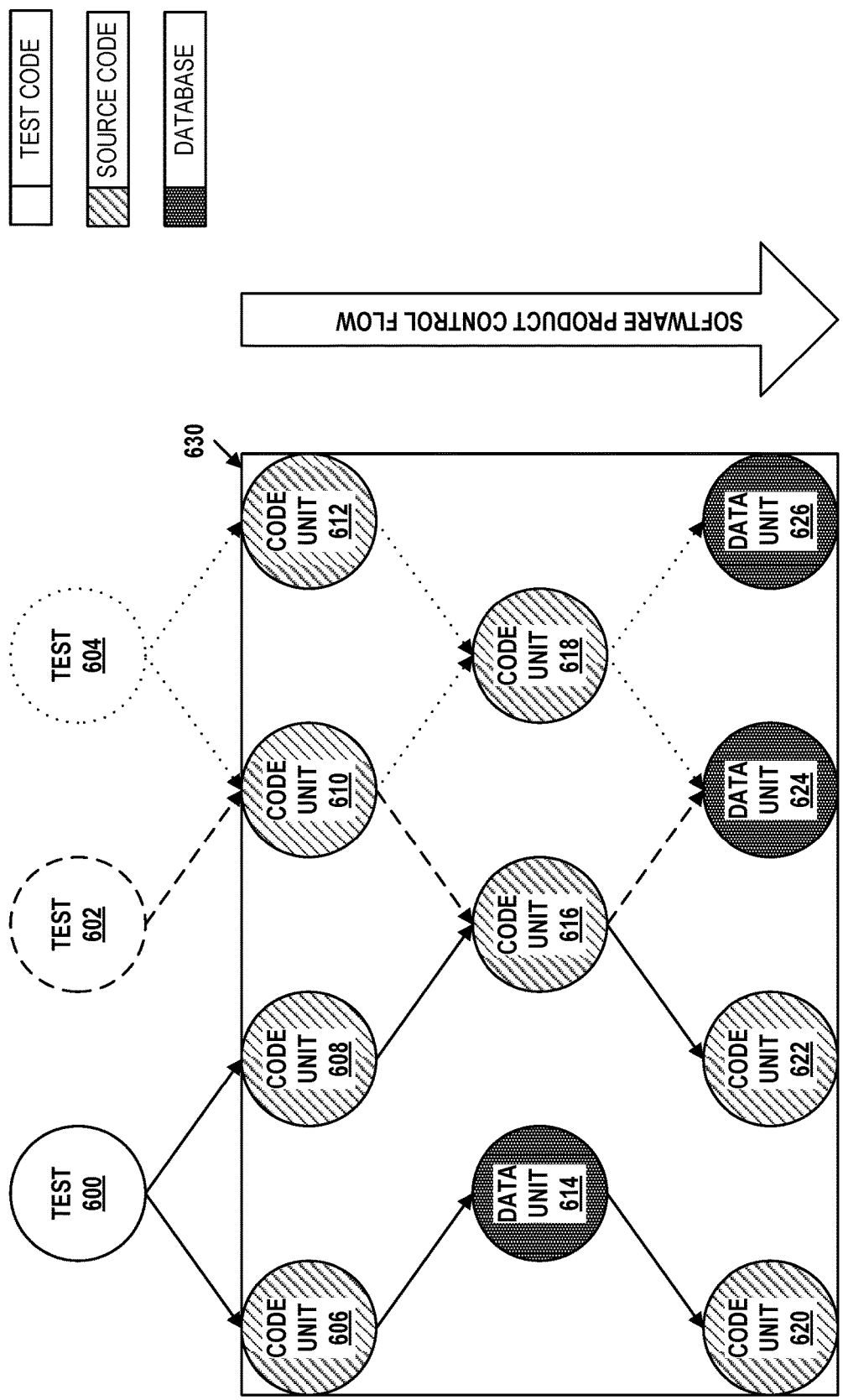
FIG. 6A illustrates control flow of a software product, in accordance with example embodiments.

FIG. 6A illustrates software control flow of an example software product 630 resulting from testing of software product 630 by a plurality of software tests. Software product 630 may include code units 606, 608, 610, 612, 616, 618, 620, and 622 (i.e., code units 606-622) and may access data units 614, 624, and 626 in a database. Software tests 600, 602, and 604 may be used to determine whether software product 630 operates as expected for its intended purpose. That is, software tests 600, 602, and 604 may be used to determine whether software product 630 successfully implements any desired functionality, is capable of handling a desired range of input values, does not contain defects, and executes within a desired time frame, among other factors.

In some cases, additional software tests (not shown) may be used to test software product 630, which may cause software product 630 to execute additional code units and access additional data units. Software tests 600, 602, and 604, as well as the additional software tests, may be part of a larger software test library that includes tens, hundreds, thousands, or millions of software tests, each of which may be used as part of the operations herein described.

Code units 606-622 may represent a plurality of different levels of code aggregation (i.e., code hierarchy) corresponding to different levels of granularity. For example, code units 606-622 may represent code files, functions, classes (i.e., object-oriented programming classes), methods within classes, statements, lines, branches, or instructions (i.e., assembly or binary instructions), among other possibilities.

Similarly, data units 614, 624, and 626 may represent a structure of the database (e.g., database schema) or the contents of the database stored within or organized according to the structure. For example, data units 614, 624, and 626 may represent structures of tables in the database or values stored within the table structures, among other possible parameters of the database. Structures of tables may include the amounts of rows and columns in the tables, the data type of the rows or columns, the data format of the data within the tables, or the encoding of the data within the tables, among other possibilities. In some implementations, data units 614, 624, and 626 may represent configuration items stored in a CMDB.

Execution of test 600 against or on software product 630 may cause execution of code units 606, 608, 616, 620, and 622, and may cause software product 630 to access or modify data unit 614. Notably, test 600 and the lines interconnecting the code and data units used thereby are indicated with a solid line pattern. More specifically, test 600 may provide a first input to software product 630 that causes execution of code unit 606. In response, code unit 606 accesses data unit 614, which in turn stores code unit 620 (e.g., JavaScript, extensible markup language (XML)) that is executed after being retrieved from the database. Test 600 may subsequently provide a second input to software product 630 causing execution of code unit 608. In response, code unit 608 causes execution of code unit 616, which in turn causes execution of code unit 622.

Similarly, execution of test 602 against or on software product 630 causes execution of code units 610 and 616, and accessing or modification of data unit 624, as indicated by the dashed line pattern. That is, test 602 may provide an input to software product 630 that causes execution of code unit 610, which in turn causes execution of code unit 616. Code unit 616 may access data unit 624. However, code unit 616 might not invoke or cause the execution of code unit 622 when code unit 616 is executed in response to the input initially provided by test 602, as indicated by the absence of a dashed line between code units 616 and 622.

Likewise, execution of test 604 against or on software product 630 causes execution of code units 610, 612, and 618, and accessing or modification of data units 624 and 626, as indicated by the dotted line pattern. Test 604 may provide a first input to software product 630 that causes execution of code unit 610, which in turn causes execution of code unit 618. Code unit 618, when called by code unit 610, accesses data unit 624. Test 604 may also provide a second input to software product 630 that causes execution of code unit 612, which in turn causes execution of code unit 618. Code unit 618, when called by code unit 612, accesses data unit 626. However, code unit 610 might not invoke or cause the execution of code unit 616 when code unit 610 is executed in response to the input initially provided by test 604, as indicated by the absence of a dotted line between code units 610 and 616.

After execution of the respective code units, software product 630 may return an output to the corresponding test, allowing the output to be evaluated by the corresponding test to determine whether software product 630 operates as desired. Notably, the software control flow illustrated in FIG. 6A for software product 630 is provided as an example. The operations herein described may be equally applicable to other software products, which may be more complex (e.g., have more code units and/or data units) or less complex (e.g., have fewer code units and/or data units). For example, in some software products, multiple software tests executed thereon may ultimately converge to a group of one or more code units (e.g., library functions used by the code units invoked by the multiple software tests).

In order to quantify the extent to which each of tests 600, 602, and 604 evaluates or covers the different code units and data units of software product 630, a computing device, which may be referred to as a testing device, may determine code coverage data and database coverage data while executing the software tests. To that end, software product 630 may be modified (e.g., injected) with additional code that allows the testing device to determine which code units or portions thereof are being executed and which data units or portions thereof are being accessed or modified by the software tests. The additional code might be injected into software product 630 temporarily for the purpose of determining code coverage, but might not form part of a publicly-available release of software product 630. In an example implementation, each code unit may be modified to write to a log file when it is invoked. The log file may then be read to determine the software control flow resulting from execution of a given software test. In another example, each code unit may be modified to add software tracing calls to generate an indication of the code units executed by a given software test.

Alternatively or additionally, in some implementations, the code coverage data and database coverage data may be determined without injecting code into software product 630. The testing device may instead execute software product in a computing environment configured to track the execution of the different parts of software product 630. The code coverage data may be determined using a software tool such as Java Code Coverage (JaCoCo), Coverage.py, ATLASSIAN CLOVER®, Bullseye Coverage, FrogLogic CoCo, or MICROSOFT VISUAL STUDIO®, among other possibilities. The particular software tool may be selected based on, for example, the programming language in which a software product is written.

FIG. 6B illustrates example code coverage data that may be generated based on execution of test 600 against software product 630. The code coverage data may indicate, for each of code units 606-622, the extent to which classes, methods, lines of code, code branches, and instructions, among other possibilities, are executed by software test 600. Notably, the format of the code coverage data may depend on the level of code abstraction, code aggregation, or code hierarchy represented by code units 606-622 (e.g., file, class, method, function, branch, etc.). For example, when code units 606-

622 represent methods, the code coverage data might indicate coverage of methods, lines, branches, and instructions, but not of classes (i.e., the superset of methods). That is, the code coverage data may indicate coverage of the code unit and sub-units of the code unit, but not of constructs larger than the code unit. However, the testing device may be configured to allow the level of granularity of a code unit to be controlled by a user. That is, a user may be able to select the level of code abstraction, code aggregation, or code hierarchy represented by a code unit in order to control the software testing process with more precision.

Code coverage data may be determined independently for each software test. That is, each respective software test may be executed individually to determine the code units and data units that the respective software test invokes. Executing multiple tests simultaneously might not allow for a determination of which one of the multiple tests caused the execution of a given code unit. Thus, independent code coverage data similar to that shown in FIG. 6B may be determined for each of tests 602 and 604 (as well as any additional software tests in a test library). FIG. 6B shows that test 600 does not invoke code units 610, 612, and 618, but executes code units 606, 608, 616, 620, and 622 and the different portions or sub-units thereof to the extents shown in the table.

The code coverage data may additionally indicate the order in which the code units are invoked. That is, the code coverage data may be used to determine the control flow of the software product, as shown in FIG. 6A, as well as a task graph as will be discussed with respect to FIGS. 8A and 8B.

FIG. 6C illustrates example database coverage data that may be generated based on execution of software test 600 against software product 630. The database coverage data indicates that test 600 accesses or modifies 2% of the data values stored in data unit 614, and does not modify any of the structures of tables within the database. As with the code coverage data, the testing device may determine the database coverage data for each software test individually. That is, additional and separate database coverage data may be determined for each of software tests 602 and 604 (as well as any other tests in the test library) in addition to the database coverage data shown in FIG. 6C for software test 600. Data units 614, 624, and 626 may be stored in one or more different databases, and the accessing or modification of data therein in response to a given software test may be represented by the database coverage data.

The database coverage data may be determined by comparing a first image or snapshot of the database taken before execution of a given software test to a second image or snapshot of the database taken after execution of the given software tests. By comparing the first and second images, the testing device may determine which values and table structures within the database were modified in response to execution of the given software test. Additionally or alternatively, the database may be configured to generate a record of any data usage (i.e., accesses or modifications), which may take the form of a database usage log file. In some implementations, accessing or modification of the database may be timestamped. Thus, the record may contain a date and time corresponding to any modifications or accesses that took place. The testing device may thus verify that a given software test used (i.e., accessed or modified) a data unit by comparing an execution time of the software test to a time at which the database or, more specifically, the data unit, has been accessed or modified.

The code coverage data determined for each of tests 600, 602, and 604 may be used to determine a first mapping between (i) software tests 600, 602, and 604 and (ii) one or more of code units 606-622. FIG. 6D illustrates an example first mapping. Test 600 is mapped to each of code units 606, 608, 616, 620, and 622, as represented by the "X" in the corresponding cell of the table shown in FIG. 6D. That is, test 600 is mapped to each code unit of software product 630 that is invoked by execution of test 600. Test 600 is mapped to code units based on the code coverage data collected for test 600. Similarly, test 602 is mapped to code units 610 and 616, and test 604 is mapped to code units 610, 612, and 618. The mappings for test 602 and 604 are similarly based on the code coverage data collected for these respective tests. Notably, the mapping illustrated in FIG. 6D corresponds to the control flow shown in FIG. 6A.

The first mapping may additionally include various parameters, including the code coverage data, associated with execution of a particular code unit in response to a given software test. For example, the first mapping may indicate that code unit 610, when executed in response to software test 604, takes 5 seconds to execute, uses 206,032 kilobytes of memory, invokes covers 90% of the classes within code unit 610, and invokes 75% of the instructions within code unit 610, among other execution parameters. Each combination of code unit and software test marked by an "X" may be associated with similar parameters. As described in more detail below, these parameters may be used in determining sets of software tests that, as a combination, meet desired execution criteria.

Similarly, the database coverage data determined for each of tests 600, 602, and 604 may be used to determine a second mapping between (i) software tests 600, 602, and 604 and (ii) one or more of data units 614, 624, and 626. FIG. 6E illustrates an example second mapping. Test 600 is mapped to data unit 614, as represented by the "X" in the corresponding cell of the table shown in FIG. 6E. That is, test 600 is mapped to each data unit that is invoked by test 600 based on the database coverage data collected for test 600. Similarly, test 602 is mapped to data unit 624, and test 604 is mapped to data units 624 and 626. Notably, the mapping illustrated in FIG. 6E corresponds to the control flow shown in FIG. 6A.

The second mapping may also include various parameters, including the database coverage data, associated with access or modification of a particular data unit in response to a given software test. For example, the mapping may indicate that data unit 626, when executed in response to software test 604, accesses 5 data values, modifies 3 data values, accesses 2 different database table structures, and modifies the structure of 1 database table, among other execution parameters. Each combination of data unit and software test marked by an "X" may be associated with similar parameters. As described in more detail below, these parameters may also be used in determining sets of software tests that, as a combination, meet desired execution criteria.

Notably, if the testing device relied only on the first mapping, the testing device might not identify the relationship between test 600 and code unit 620 which is stored in the database (i.e., in data unit 614), rather than as a file in a file system. Code unit 620 may form part of the first mapping in spite of being stored in the database because it represents executable code (e.g., a script) rather than data. However, in some cases, code units written in a particular programming language may be classified as either code or data, depending on programmer preference or other considerations.

Figure 7:
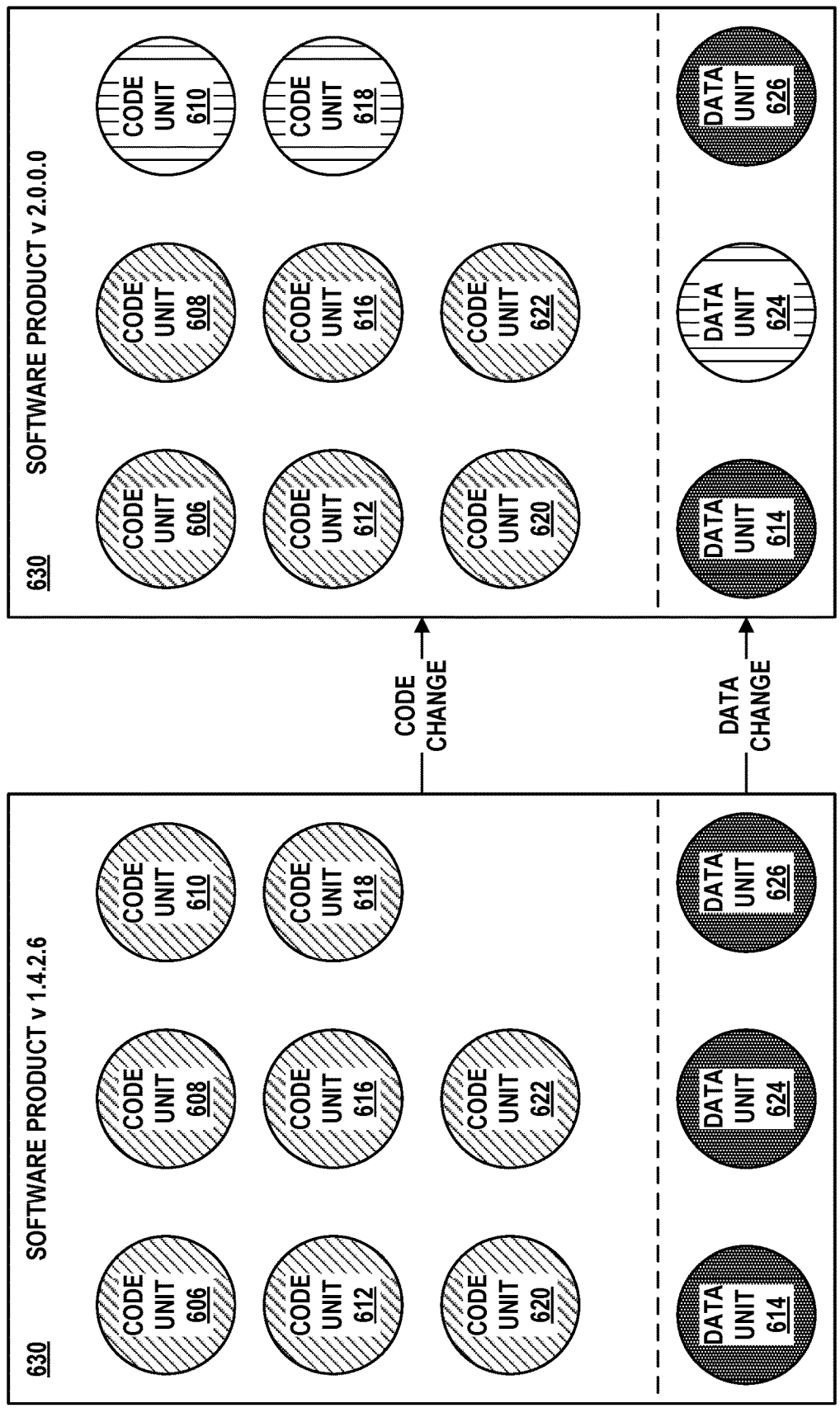
FIG. 7 illustrates a change in code units and data units across different versions of a software product, in accordance with example embodiments.

The first and second mappings may be used by the testing device to select software tests to execute against software product 630 when code units or data units of software product 630 are modified. FIG. 7 illustrates a change in software product 630 across the software development cycle. A first version (e.g., v 1.4.2.6) of software product 630 may be superseded, replaced, or upgraded to a second version (e.g., v 2.0.0.0) of software product 630. The extent of changes between the first version and the second version may vary, ranging from, for example, modifications of single lines of code to, for example, rewriting of entire code units or restructuring of entire data units. The changes may include additions of new code units or new data units. The changes may be made by any number of programmers at any stage during the software development process. Any changes between the first and second version may need to be tested to verify that the second version of software product 630 still operates for its intended purpose.

However, executing all or even a subset of all available software tests against the second version of software product 630 may be time consuming. For example, executing a large library of software tests against software product 630 might take several hours or days, putting further development and refinement of software product 630 on hold until the software tests finish running. Additionally, many of the software tests might not actually test code units or data units that have changed, or even test code or data units that interact with the code or data units that have changed. Running such tests may thus consume time without evaluating the effect of changes between the first and second versions on performance of software product 630.

Accordingly, the testing device may utilize the first and second mappings to more intelligently select software tests. The testing device may compare the first and second versions of software product 630 to identify code and data units that have been modified or changed between the first and second versions. For example, the testing device may identify that code units 610 and 618 as well as data unit 624 have changed between the first and second versions, as indicated by these units having a vertical line pattern in FIG. 7. A change in code units 610 and 618 may be identified by comparing the files containing, for example, the first and second versions of the source code or binary code of code units 610 and 618. A change in data unit 624 may be identified by comparing (i) a database image corresponding to the first version of software product 630 to (ii) a database image corresponding to the second version of software product 630. The testing device may compare table structures stored in the database or values stored in the table structures in the database, among other possibilities.

Additionally, a change in a code unit that is stored in a database (e.g., code unit 620) may be similarly identified by comparing database images corresponding to the first and second versions of software product 630. Notably, a modification in such a code unit might not otherwise be identifiable without considering the impact of data units on execution of software tests by determining database coverage data and the second mapping.

The testing device may use the first and second mappings shown in FIGS. 6D and 6E, respectively, to identify a set of software tests that impact the changed code units 610 and 618 and the changed data unit 624, respectively. This may take place at any point in the software testing process such as during, for example, at a push checkpoint, a staging checkpoint, or a production checkpoint, as discussed below. Looking at FIG. 6D, code unit 610 is executed in response to execution of tests 602 and 604 against software product 630. Similarly, code unit 618 is executed in response to execution of test 604 against software product 630. Looking at FIG. 6E, data unit 624 is accessed or modified in response to execution of tests 602 and 604 against software product 630. Changes to code units 610 and 618 and data unit 624 can thus be evaluated by execution of software tests 602 and 604, but not test 600.

Accordingly, the testing device may determine, for each changed code unit, using the first mapping, software tests that cause the changed code unit to be executed. Similarly, the testing device may determine, for each changed data unit, using the second mapping, software tests that cause the changed data unit to be accessed or modified. The testing device may then determine a set of software tests to execute against the second version of software product 630 by taking the union of the software tests that cause the changed code units to be executed and the software tests that cause the changed data units to be accessed or modified.

Accordingly, a small extent of changes to code units or data units of software product 630 may be tested by running, for example, only 5% of available software tests, rather than running 100% the software tests, thus saving time and freeing up computational resources for other tasks.

In some implementations, the first and second mappings may be used independently of one another. That is, in some cases, the first mapping may be used to identify a set of software tests to test a change in software product 630 without also using the second mapping, and vice versa. Additionally, regardless of how the software tests are selected to test a given change in code or data, any software tests identified multiple times might be executed only once to avoid redundant executions of the same test.

Figure 8A:
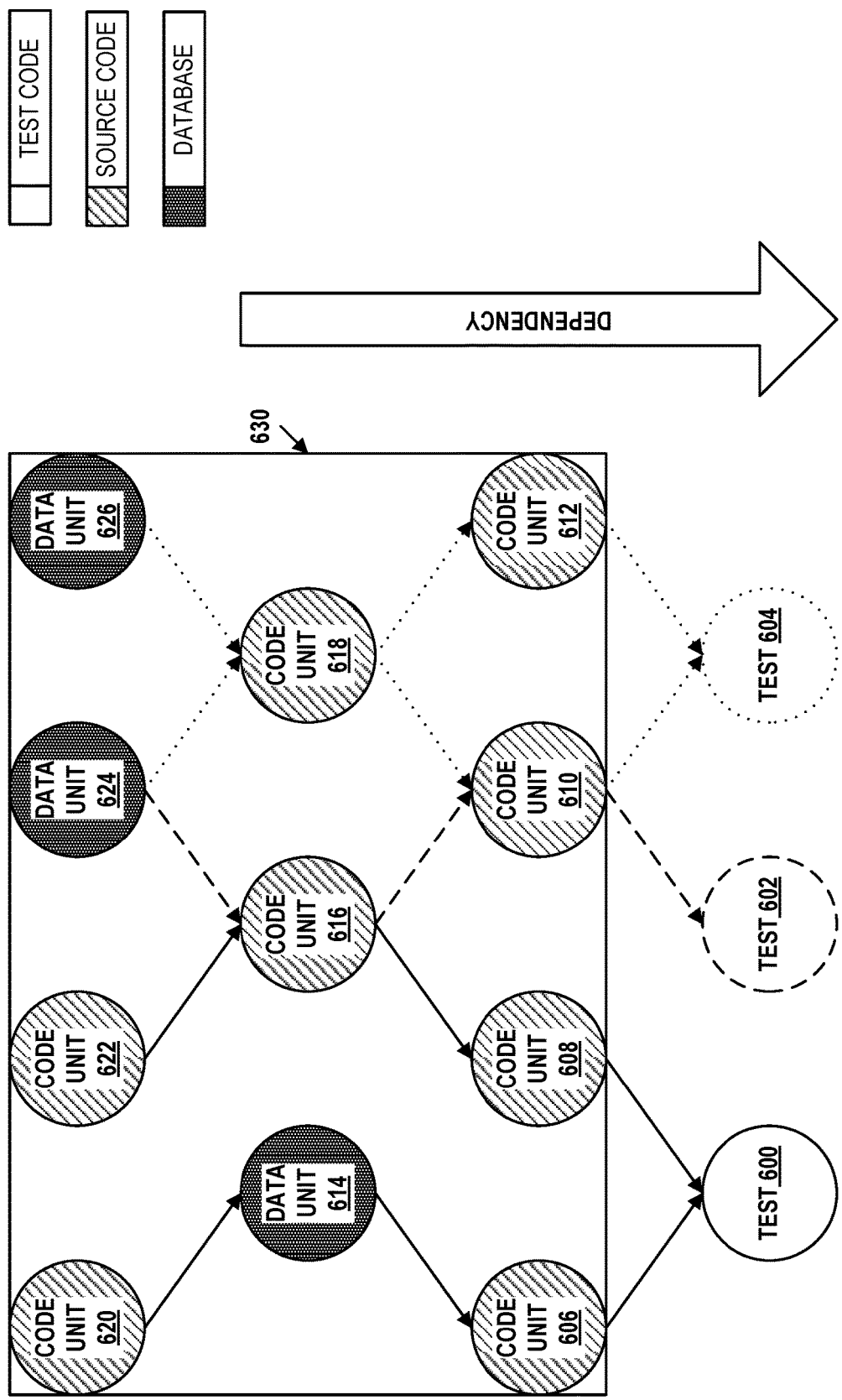
FIG. 8A illustrates dependencies between software tests, code units, and data units, in accordance with example embodiments.

In some implementations, the first and second mappings, rather than being expressed as a table, as shown in FIGS. 6D and 6E, may be expressed as a task graph, as illustrated in FIG. 8A. The task graph may, in addition to illustrating the mappings, indicate dependencies between the code and data units that make up software product 630. Specifically, the first and second mappings, as well as the code coverage and database coverage data, may be used by the testing device to determine dependencies between software tests 600-604, code units 606-622, and data units 614-626. The dependencies may indicate an order in which code units 606-622 are executed and data units 614-626 are accessed or modified in response to execution of tests 600-604 against software product 630. For example, code units 608 and 610 are each dependent on code unit 616 because each of them calls code unit 616 during execution. Notably, the dependencies shown in FIG. 8A are the inverse of the software control flow illustrated in FIG. 6A.

Figure 8B:
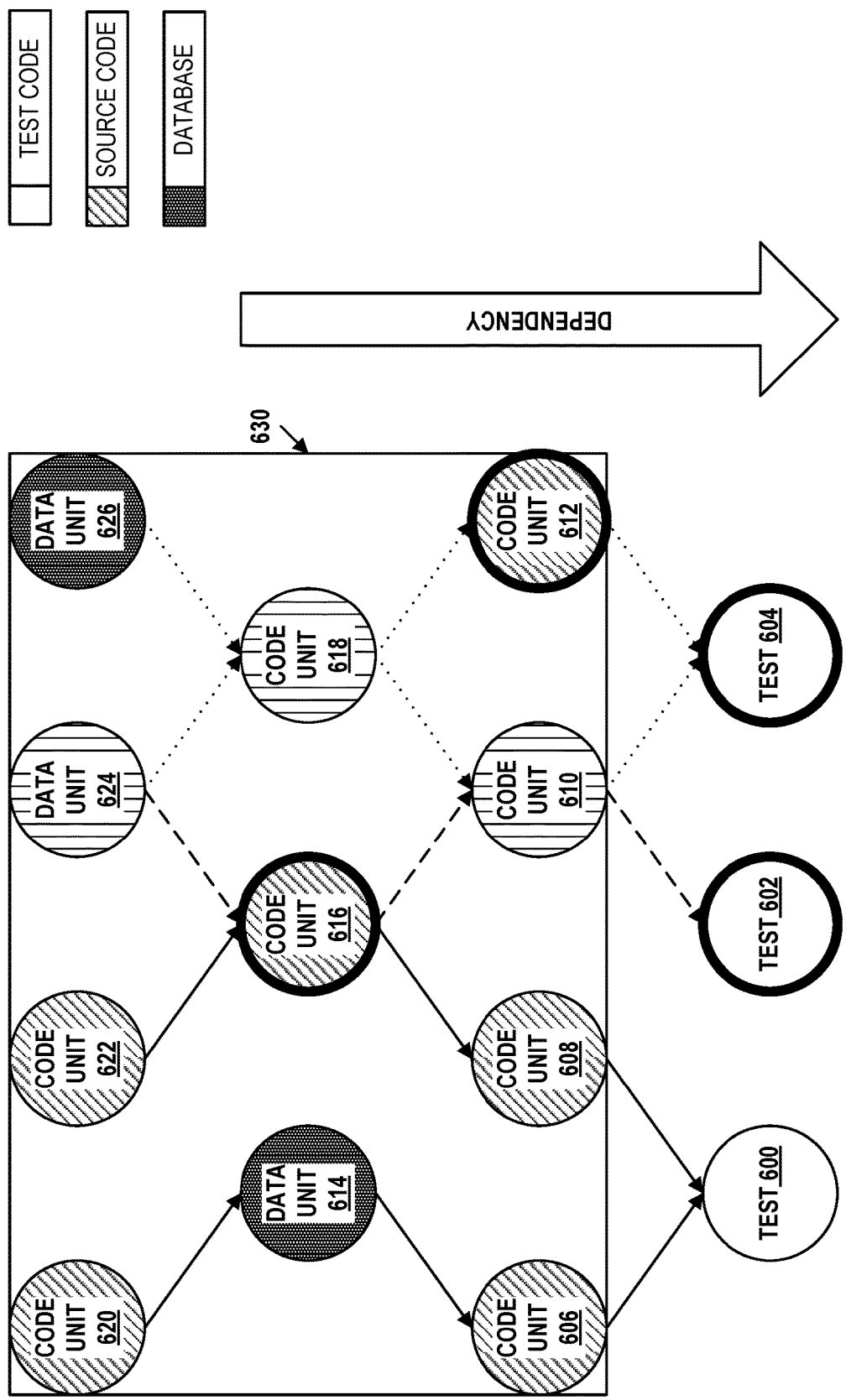
FIG. 8B illustrates software tests and code units affected by a change in a software product, in accordance with example embodiments.

The task graph illustrated in FIG. 8A may, like the mappings shown in FIGS. 6D and 6E, be used to identify software tests that will evaluate any changed code or data units of software product 630. FIG. 8B illustrates code units 610 and 618 and data unit 624 that have been changed between the first and second versions of software product 630, as shown in FIG. 7. Tests invoking changed code or data units may be identified by traversing the task graph downwards from the changed code or data unit to the corresponding software tests at the bottom of the graph. Notably, each downward traversal along the task graph should follow the lines of a single pattern. For example, a first traversal from data unit 624 should follow the dashed line to code unit 616, code unit 610, and test 602, thus identifying test 602 as a test that invokes accessing or modification of data unit 624. Similarly, a second traversal from data unit 624 should follow the dotted line to code unit 618, along a first branch through code unit 610 to test 604, and along a second branch through code unit 612 to test 604, thus identifying test 604 as another test that invokes accessing or modification of data unit 624.

However, in addition to selecting the set of software tests to evaluate particular code and data changes, the dependencies expressed by the task graph of FIGS. 8A and 8B may also be used to more accurately and quickly identify the cause or source of errors in the code or data units that are executed by a particular software test. Notably, the task graph may be used to identify the proximity of (i) unmodified code and data units (indicated with a heavy outline) executed by the software tests to (ii) code or data units that have been modified (indicated with a vertical line pattern). Since the code and data units of a software product often coordinate with one another to produce the desired functionality, changes to certain code or data units may reveal preexisting errors in unmodified code or data units. Unmodified code or data units that are closest to a given modified code or data unit may be more likely to be the cause of an error than code or data units further away from the modified code or data unit.

The software development application may thus be configured to, in response to software product 630 failing or underperforming on a software test, determine a hierarchy of potential sources of error causing the failure or underperformance. For example, when software test 600 fails, and assuming only code unit 622 has been modified, the hierarchy of potential sources of error may include code unit 622, code unit 616, and code unit 608, ordered from highest to lowest probability of being the cause of the error.

Additionally, the dependencies expressed by the task graph of FIGS. 8A and 8B may be used to determine an order in which the software tests are executed. For example, the task graph may be used to identify combinations of parallelizable tests. Two or more software tests may be parallelizable when they use mutually exclusive data units or utilize complimentary amounts of computing resources (e.g., memory resources, processing resources), among other factors. Usage of a complementary amount of resources by two software tests may involve, for example, usage of 40% of the computing resources by one of the tests and usage of 50% of the computing resources by the other software test (with 10% of the resources remaining unused). On the other hand, two software tests whose combined usage of computing resources would be greater than 100% of the available resources would not be considered complimentary. Thus, a group of software tests utilize a complimentary amount of computing resources when their total usage or computational resources is near (e.g., within 10% or 20% of) 100% of the available computing resources.

Software tests 602 and 604 each use data unit 624, and thus might not be parallelizable. Namely, tests 602 might erroneously modify data unit 624. When both tests are executed simultaneously, test 604 may subsequently utilize the erroneously modified data unit 624 before it could be reset or corrected, resulting in apparent failure of test 604, where in fact it was execution of test 602 that caused the failure. Such a problem may be avoided by scheduling tests 602 and 604 to be executed sequentially and by resetting data unit 624 to a predetermined state therebetween.

In another example, execution of tests 602 and 604, or specific code or data units thereof, may utilize large amounts of memory, while execution of test 600, or specific code or data units thereof, may utilize a smaller amount of memory. Tests 600, 602, and 604 may thus be scheduled such that a test (or a code or data unit thereof) that utilizes a large amount of memory (e.g., test 602) runs in parallel with a test (or a code or data unit thereof) that utilizes a small amount of memory (e.g., test 600), thereby allowing the tests to be efficiently parallelized. Tests that use large and small amounts of processing resources (e.g., processor cores) may be similarly scheduled such that tests (or code or data units thereof) that utilize a large amount of processing resources are scheduled in parallel with tests (or code or data units thereof) that utilize a small amount of processing resources.

To that end, the software development application system may rely on the parameters associated with each pair of code unit and software test marked with an "X," as shown in FIG. 6D, or each pair of data unit and software test marked with an "X," as shown in FIG. 6E, when scheduling software test. The testing device may additionally use these parameters, as well as the code coverage data and database coverage data shown in FIGS. 6B and 6C, when selecting the set of software tests to be executed. Namely, a software developer may desire that a set of tests evaluate at least a threshold fraction of the changed code or data and that the set of tests execute in under a threshold amount of time. That is, the software developer may wish to balance thoroughness of testing against testing time, among other criteria. The testing device may therefore be configured to receive input data indicating various testing criteria such as, for example, maximum execution time and minimum coverage of the modified code or data. The testing device may be configured to determine a set of software tests that satisfies the various testing criteria based on the first and second mappings, the code coverage data, the database coverage data, and the task graph, among other factors.

In some cases, software product 630 may be modified by the addition of code units or data units that have not yet been mapped. In such cases, the first and second mappings may be (statically) updated by parsing the added code or data units as well as any mapped code or data units to identify how the added code or data units fit into the software control flow. Alternatively or additionally, the first and second mappings may be (dynamically) updated by re-executing the plurality of software tests against software product 630 to determine an updated first mapping and an updated second mapping that accounts for the added code or data units.

VI. Example Software Development Application

Continuous integration is a software development practice that involves software developers integrating, checking-in, or merging source code updates into a shared repository of a software product with at least a minimum frequency, such as once or twice per day. Each source code update may be verified or validated by a rebuild of the software product and execution of software tests against the rebuilt software product. Continuous integration may also be used in combination with continuous delivery, a software development methodology that allows for frequent releases of software modifications and updates by maintaining the software product in a deployable state. These processes may involve coordination among a number of different systems and computing devices, such as a content management system, a build server, and a testing server, among other possibilities.

In some cases, these different systems may be developed by different providers and/or may be hosted as part of different computing systems. Accordingly, a software developer may dedicate a considerable amount of time to integrating the operations of these different systems. For example, the software developer may dispatch tasks to a second one of the systems (e.g., a testing server) after a first one of the systems (e.g., a build server) completes its operations. The systems may thus sometimes be idle while awaiting the software developer to provide additional instructions regarding the software testing process. When software testing takes a long period of time, such inefficiencies in deploying software tests among multiple developers may result in inefficient usage of computational resources and delays in the software development process.

Alternatively, the software developer may, in order to automate the process, configure the different systems to communicate with one another to automate parts of the software development and testing process. Even such automation, however, might not provide for manipulation and scaling of various parameters involved in the development and testing process based on the stage, milestone, or checkpoint within the software product development cycle at which a source code update is generated.

Accordingly, described herein is a software application configured to centralize the control and coordinate the operations of multiple different systems used in a continuous integration, continuous delivery, or other software development process. The software application may allow a developer to define checkpoints within a software product development cycle and, for each given checkpoint, define corresponding parameters and settings according to which a source code update to the software product is built and tested at the given checkpoint. The software application may be configured to automatically carry out the building of the software product, selection of software test, and testing of the software product to evaluate source code updates according to the defined parameters and settings. For example, a request to merge a source code update with a branch of the software product may trigger the software application to automatically build and test the source code update, coordinating the different systems involved in this process, with little to no additional input from a software developer.

Figure 9:
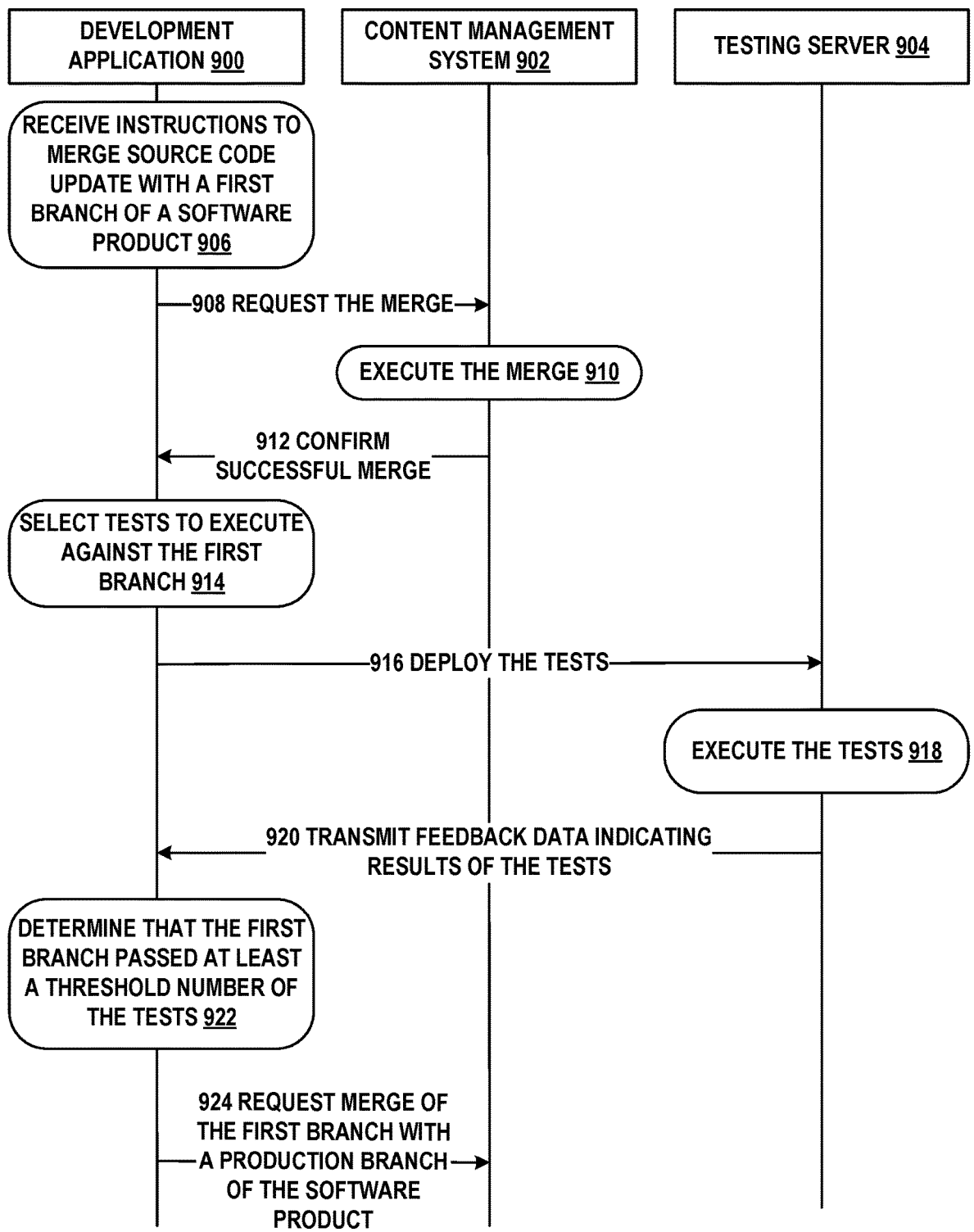
FIG. 9 illustrates a message flow diagram, in accordance with example embodiments.

FIG. 9 illustrates a message diagram between development application 900, content management system 902, and testing server 904. Development application 900 may be disposed within a computational instance (e.g., computational instance 322) of remote network management platform 320. Development application 900 may also be referred to as a software development application or simply a software application. Development application 900 may be associated with or may include a software development environment that provides for viewing and modifying the source code of a software product.

Content management system 902 may be configured to provide a software version control system such as, for example, Git, Concurrent Version System (CVS), SUBVERSION®, Mercurial, or Bazaar, among other possibilities. Content management system 902 may thus be configured to store different versions, or branches, of the software product, where each version may be at a different stage of the software product development cycle. Content management system 902 may be disposed within remote network management platform 320, within managed network 300, or within a third-party computing system or network (e.g., GITHUB®). Regardless of its location, content management system 902 may be communicatively connected with development application 900.

Testing server 904 may be configured to store and execute a plurality of software tests on different versions of the software product. Testing server 904 may also be configured to build the software product by, for example, retrieving or receiving source code from content management system 902, compiling the source code to generate binaries, and linking the binaries with files and libraries, among other operations. To that end, testing server 904 may include software such as, for example, JENKINS®, APACHE MAVEN™, ATLAS SIAN BAMBOO®, or ECLIPSE HUDSON®, to automate building of the software product and the execution of the software tests.

Testing server 904 may represent a single computing device or multiple computing devices (e.g., a server cluster) among which operations may be distributed. Thus, testing server 904 may also be referred to as a software testing system. In one example, one or more computing devices of testing server 904 may be configured to build the software product while another one or more computing devices of testing server 904 may be configured to execute tests against the built software product. Testing server 904 may be disposed within remote network management platform 320, within managed network 300, or within a third-party computing systems or network (e.g., AMAZON WEB SERVICES®). Regardless of its location, testing server 904 may be communicatively connected with development application 900 and content management system 902.

The software product may be any piece of software such as, for example, a stand-alone software application, software that forms part of computational instances of remote network management platform 320, or different versions/releases thereof. Thus, development application 900 may be usable by software developers associated with managed network 300 to develop software products for managed network 300 and/or by software developers associated with remote network management platform 320 to modify aspects of remote network management platform 320, among other possibilities.

Development application 900 may be used by a software developer to generate a source code update within the source code of the software product. To that end, development application 900 may be configured to provide instructions to content management system 902 to generate a copy of a production branch, a master branch, or another branch of the software product representing an up-to-date version thereof. The generated copy may form a development branch to which changes may be made by the developer. A branch may represent a version or iteration of the software product as stored in a version control system. A branch may alternatively be referred to as a tree or a codeline. For example, the production branch may contain a stable version of the software product that includes successfully tested source code updates made by various developers. In some implementations, the production branch may be or may be referred to as the trunk or mainline of the software product.

Development application 900 may be used to generate source code updates to the software product by modifying the content of the development branch. Specifically, a first remote copy of the development branch may be stored in content management system 902 and a second local copy thereof may be stored locally in development application 900. Source code updates may initially be made to the second local copy and may be periodically merged with the first remote copy.

After a source code update is generated using development application 900, development application 900 may receive instructions to merge the source code update with a first branch of the software product, as indicated by block 906. The first branch may be the development branch (e.g., the first remote copy thereof), a staging branch, or another branch corresponding to a particular checkpoint within a development cycle of the software product. Development application 900 may be configured to carry out the subsequent steps in the testing of the source code update according to parameters corresponding to the first branch and the checkpoint associated therewith, as discussed in more detail with respect to FIG. 10. Thus, the mapping associated with the first branch may determine the extent of testing performed on the source code update.

In response to or based on receiving the instructions at block 906, development application 900 may transmit, to content management system 902, instructions requesting that the source code update be merged with the first branch, as indicated by arrow 908. The format and content of these instructions may depend on the specific version control system utilized by content management system 902. For example, the instructions may identify the two branches to be merged—the first branch (e.g., the first remote copy of the development branch) stored by content management system 902 and lacking the source code update and a second branch (e.g., the second local copy of the development branch) stored by development application 900 and containing the source code update.

In response to or based on receiving the request at arrow 908, content management system 902 may merge the source code update with the first branch, as indicated by block 910. In some cases, such as when there is a merge conflict between the source code update and contents of the first branch, content management system 902 may transmit a request for assistance from a developer in executing the requested merge. The request for assistance may ask that the developer indicate which portions of the conflicting code to keep, which portions of the conflicting code to delete, and/or how to modify the conflicting code to resolve the conflict.

In response to or based on executing the merge at block 910, content management system may transmit, to development application 900, a confirmation of successfully completing the requested merge of the source code update with the first branch, as indicated by arrow 912. In response to or based on receiving the confirmation at arrow 912, development application 900 may select software tests to execute against the first branch as modified or updated to contain the source code update, as indicated by block 914. That is, development application 900 may select software tests to evaluate the source code update in the context of the first branch. Development application 900 may select the software tests based on a portion of the first branch modified by the source code update. Namely, development application may select software tests that invoke execution of code units that contain the source code modification, either directly or indirectly, as described with respect to FIGS. 6A to 8B.

Development application 900 may also select the software tests based on the predetermined checkpoint within the development cycle to which the first branch corresponds. Depending on the checkpoint, the type of tests, amount of tests, or execution time of tests, may be different. For example, checkpoints earlier in the development cycle may be associated with fewer tests that quickly evaluate a small portion of the software product (e.g., unit tests) while checkpoints later in the development cycle may be associated with more tests that take a longer amount of time to evaluate a larger portion of the software product.

In some implementations, in addition to selecting the software tests, development application may be configured to determine a portion or subset of the software product, as represented by the first branch, to rebuild. Rebuilding the software product using the first branch may incorporate the source code update into an updated executable version of the software product. By rebuilding only the subset of the software product that was modified and, for unmodified portions of the software product, reusing previously-built files, the testing time of the source code update may be significantly reduced. In one example of this system in practice, build time of the software product may be reduced by 37% from approximately 40 minutes to 25 minutes. Higher reductions in build time may be possible for other software products.

The subset of the software product to rebuild may be determined based on the code units modified by the source code update using the techniques discussed with respect to FIGS. 6A-8B. For example, code units that (i) have been modified and (ii) are planned to be invoked by the selected software tests (or portions of the software product containing such code units) may be selected to be rebuilt. Development application 900 may be configured to provide, to testing server 904 (or another build server), instructions to rebuild the determined portion of the software product to generate an updated executable version of the software product that contains therein the source code update. Alternatively, in some implementations, testing server 904 (or another build server) may be configured to determine the subset of the software product to be rebuilt in response to or based on instructions from development application 900.

In response to or based on the selection of the software tests at block 914, development application 900 may transmit, to testing server 904, instructions to deploy the selected software tests on the first branch, as indicated by arrow 916. The instructions may include a list of the selected tests, the selected tests themselves, and/or a schedule (e.g., ordering of tests, parallelization of the tests, etc.) according to which the selected tests are to be executed, among other possibilities. In some implementations, the instructions may also include the updated executable version of the software product or an identification of a location thereof, thereby indicating that testing server 904 is to execute the selected software tests on the updated executable version of the software product.

In some implementations, the instructions transmitted at arrow 916 (or a portion thereof) may alternatively be provided to testing server 904 by way of content management system 902. For example, content management system 902 may be configured by development application 900 to deploy the selected tests in response to or based on successfully executing the merge at block 910. To that end, the operations of block 914 may be executed before the request at arrow 908 is transmitted, allowing content management system 902 to relay the selected tests to testing server 904. Alternatively, the selection of tests at block 914 may be transmitted to testing server 904 by development application 900 but the execution thereof may be triggered by content management system 902 indicating to testing server 904 that the source code update successfully merged with the first branch.

In response to or based on reception of the instructions at arrow 916, testing server 904 may execute the selected software tests on or against the updated first branch, as indicated by block 918. Specifically, the selected software tests may be executed on the updated executable version of the software product. Execution of the tests may generate feedback data indicating results of the software tests. The results may include, among other information, whether the first branch passed or failed a given software test, any generated errors, warnings, or other output of the given software test, an execution time of the given test, and a computing resource usage by the given test, among other parameters. The feedback data may be transmitted by testing server 904 to development application 900, as indicated by arrow 920, in response to or based on termination of execution of the software tests at block 918.

In response to or based on receiving the feedback data at arrow 920, development application 900 may be configured to determine that the first branch passed at least a threshold number of software tests, as indicated by block 922. The threshold number may be defined by a threshold fraction or threshold percentage (e.g., 50%, 75%, 90%, 95%) of the software test selected at block 914. Alternatively or additionally, the threshold number may be based on a certain subset of important tests (e.g., designated as important by a developer or tester) being passed. That is, the threshold number may be met when (i) one or more designated tests pass and (ii) a designated number or fraction of additional tests (other than the designated tests) pass.

In some implementations, the value of the threshold number, fraction, or percentage may depend on the particular checkpoint within the development cycle of the software product at which the first branch is being tested. In one example, checkpoints at early stages of the development cycle may have smaller corresponding thresholds than checkpoints at later stages of the development cycle because additional revisions to the source code update may be expected to correct any flaws resulting in failed tests. Alternatively, checkpoints at early stages of the development cycle may have higher corresponding thresholds than checkpoints at later stages of the development cycle because developers may wish to correct most flaws in the source code update before propagating the source code update to later stages of the development cycle. Thus, in some implementations, the value of the threshold number, fraction, or percentage may be configurable using development application 900 (e.g., by way of a user interface) for each stage in the development cycle of the software product.

In response to or based on determining that the first branch passed at least the threshold number of the selected tests, development application 900 may be configured to transmit, to content management system 902, a request to merge the first branch with a production branch of the software product, as indicated by arrow 924. Depending on the identity of the first branch, the first branch may be merged with the production branch directly or indirectly. For example, when the first branch is a development branch, the development branch may first be merged with a staging branch before the staging branch is merged with the production branch, thus indirectly merging the first branch with the production branch. On the other hand, when the first branch is a staging branch, the staging branch may be merged with the production branch directly.

As discussed above, the production branch may include a most up-to-date version of the software product based on which additional development branches are created by developers to be used for implementing additional source code updates. Accordingly, frequently merging the first branch, and thus the source code update, with the production branch allows developers of the software product to make modifications to source code that is likely to include most of other developers' prior source code updates. Accordingly, the prior updates may be taken into consideration as further modifications are made by the developers, thereby reducing the amount of potential conflicts when merging different branches modified by multiple different developers.

When the first branch does not pass at least the threshold number of software tests, the first branch might not be merged with the production branch. Instead, development application 900 may generate an indication that the source code update needs further modifications to correct flaws that cause some of the software tests to fail. The indication may be transmitted by development application 900 to a developer associated with the source code update by way of one or more communication mechanisms such as, for example, email, short message system (SMS), push notification, or a notification within development application 900. Once the source code update is modified, the operations of FIG. 9 may be repeated to evaluate the modified source code update for inclusion in the production branch.

Figure 10:
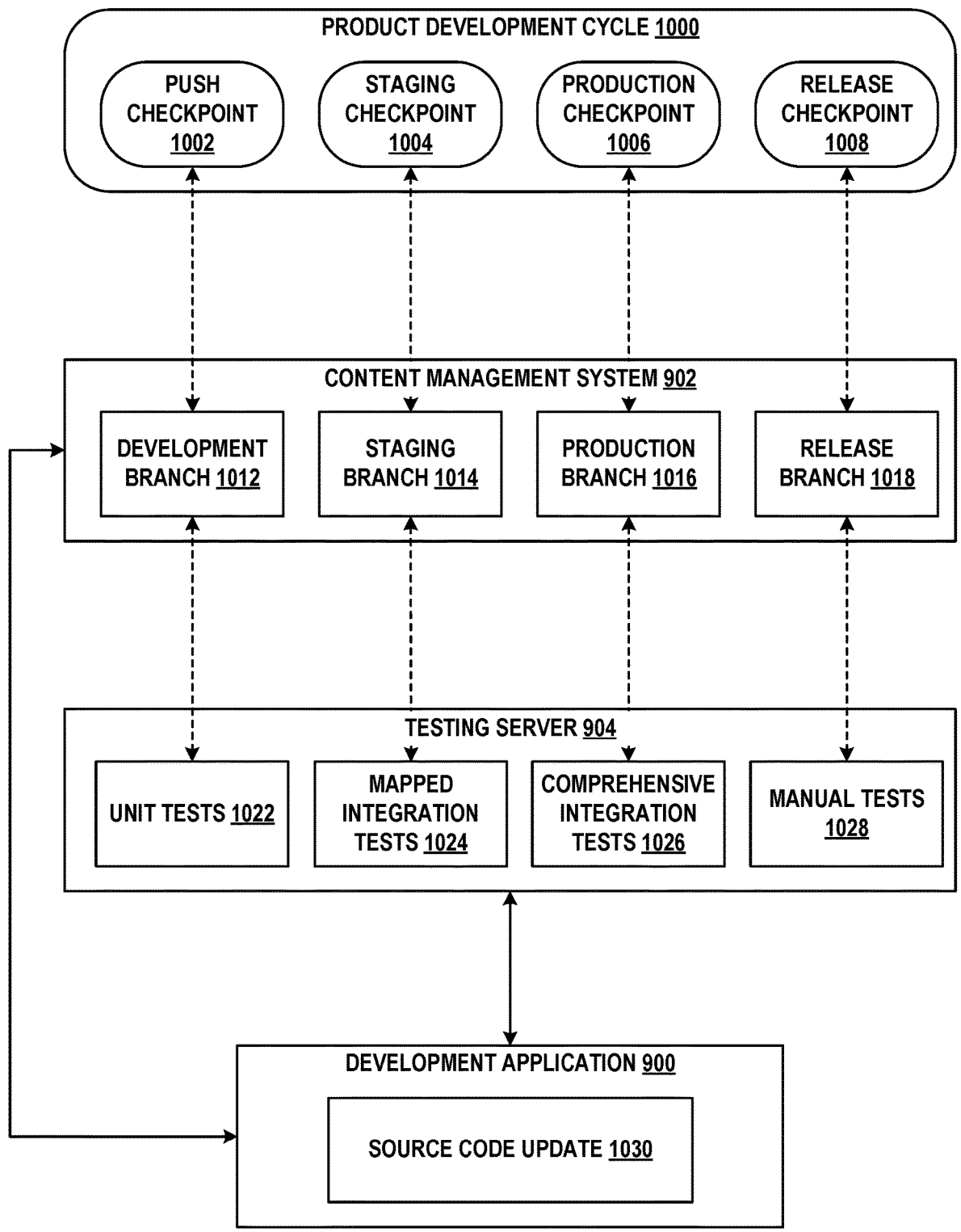
FIG. 10 illustrates a mapping between software development checkpoints, branches in a content management system, and software tests, in accordance with example embodiments.

FIG. 10 illustrates a mapping, indicated with dashed lines, between checkpoints of product development cycle 1000, branches within content management system 902, and software tests configured for execution by testing server 904. Development application 900 may be used to define the mapping and may use this mapping to automatically schedule the building and testing of different versions of a software product. To that end, development application 900 may be communicatively connected to testing server 904 and content management system 902, as indicated by solid lines. Development application 900 may additionally be used to generate source code update 1030 to implement or improve one or more features of the software product.

Product development cycle 1000 may include push checkpoint 1002, staging checkpoint 1004, production checkpoint 1006, and release checkpoint 1008 (i.e., checkpoints 1002-1008). Checkpoints 1002-1008 may each be associated with different operations, processes, practices, and rules that collectively result in the generation of a working software product. For example, push checkpoint 1002 may be associated with a group of one or more developers generating and testing a source code update to one or more code units of the software product. Staging checkpoint 1004 may be associated with merging and testing the source code updates generated by multiple groups of developers. Production checkpoint 1006 may be associated with testing the source code updates of multiple groups of developers in a computational environment in which the software product will ultimately be used by end-users (e.g., a production environment). Release checkpoint 1008 may be associated with manual testing of the software product as modified by the different groups of developers to replicate expected end-user behavior.

Development of a software product may generally proceed through checkpoints 1002-1008 sequentially from push checkpoint 1002 to release checkpoint 1008. However, flaws in the software product uncovered in a later stage of development cycle 1000 (e.g., production checkpoint 1006) may dictate a reversion to an earlier stage (e.g., push checkpoint 1002) to generate and test source code updates that correct the flaws. Notably, in some implementations, checkpoints may be renamed, removed, and/or replaced, and new checkpoints may be added. Nevertheless, these modified checkpoints may adhere to a mapping similar to that shown in FIG. 10, allowing development application 900 to be used to manage progression of a source code update through development cycle 1000.

Content management system 902 may include development branch 1012, staging branch 1014, production branch 1016, and release branch 1018. Similarly, testing server 904 may be configured to execute unit tests 1022, mapped integration test 1024, and comprehensive integration tests 1026, and may provide for execution of manual tests 1028 by one or more developers or testers.

Each branch may be mapped to a different stage within development cycle 1000 and a corresponding set or class of software tests, as indicated with dashed lines. By providing instructions to merge a source code update with a particular branch, a developer may indicate to development application 900 the corresponding checkpoint to which the update corresponds and thus which set or class of tests are to be used to evaluate the source code update. Additionally, since each checkpoint has associated therewith different operations, processes, practices, and rules, these may be automatically applied to the source code update according to the branch into which the source code update is requested to be merged.

Specifically, development branch 1012 may be mapped to (i) push checkpoint 1002 and (ii) unit tests 1022. Source code updates requested to be merged with development branch 1012 may represent initial modifications to existing code units or generation of new code units to implement a new feature in the software product. Accordingly, merges with development branch 1012 may trigger execution of unit tests 1022 that focus on the modified code units and/or the new code units (rather than, e.g., testing the software product as a whole).

Staging branch 1014 may be mapped to (i) staging checkpoint 1004 and (ii) mapped integration tests 1024. Source code updates requested to be merged with staging branch 1014 may be contained in a development branch that has passed at least a threshold number of units tests 1022 assigned thereto (i.e., unit tests that evaluate the portion of the development branch modified by the source code update). The source code updates themselves may be identical or similar to the modifications requested to be merged with development branch 1012 at an earlier time. Such modifications may be advanced to staging checkpoint 1004 by development application 900 in response to or based on the modified code units passing a threshold number of unit tests 1022. Mapped integration tests 1024 may be determined by development application 900 as discussed with respect to FIGS. 6A-8B. Namely, mapped integration tests 1024 may be selected to test the execution of (i) one or more code units that contain source code updates, (ii) additional code units invoked by the one or more code units, and (iii) further code units that invoke execution of the one or more code units.

Production branch 1016 may be mapped to (i) production checkpoint 1006 and (ii) comprehensive integration tests 1026. Source code updates requested to be merged with production branch 1016 may be contained in a staging branch that has passed at least a threshold number of integration tests 1024 mapped thereto. Again, the source code updates themselves may be identical or similar to the modifications requested to be merged with staging branch 1014 at an earlier time. Such modifications may be advanced to production checkpoint 1006 by development application 900 in response to or based on the staging branch passing a threshold number of mapped integration tests 1024.

Unit tests 1022 and mapped integration tests 1024 may be selected to adhere to particular target performance parameters or criteria including, for example, maximum execution time of the tests, target code coverage of the corresponding branch by the tests, extent of parallelizability of the tests, extent of usage of computational resources of the testing server, and/or any other parameters discussed with respect to FIGS. 6A-8B, among other possibilities. Comprehensive integration tests 1026 may represent a superset of mapped integration tests 1024. For example, comprehensive integration tests 1026 may represent all tests available to evaluate a given software product.

In some cases, however, comprehensive integration tests 1026 may represent all tests that cause the execution of code units containing the source code updates. For example, in contrast to mapped integration tests 1024, comprehensive integration tests 1026 may involve executing all software tests applicable to a given source code update regardless of the resource usage involved therewith. Alternatively, in some cases, rather than executing all applicable software tests, comprehensive integration tests 1026 may involve executing a greater number of software tests than provided for by mapped integration tests 1024 while adhering to more permissive target performance parameters (i.e., allowing more resources for the execution of comprehensive integration tests 1026 than for mapped integration tests 1024).

Release branch 1018 may be mapped to (i) release checkpoint 1008 and (ii) manual tests 1028. Release branch may contain a version of the software product that is ready to be released to end-users (e.g., implements desired functionality without failures). Manual tests 1028 may include suggested uses of the software product determined, for example, to invoke execution of code units containing the source code modifications to be tested. The suggested uses may include, for example, activation of particular buttons, providing input to particular forms, and viewing particular content to access one or more databases to be tested, among other possibilities.

Source code updates requested to be merged with release branch 1018 may be contained in a production branch that has passed at least a threshold number of comprehensive integration tests 1026. Again, the source code updates themselves may be identical or similar to the modifications requested to be merged with production branch 1016 at an earlier time. Such modifications may be advanced to release checkpoint 1008 by development application 900 in response to or based on the production branch passing a threshold number of comprehensive integration tests 1026.

Development application 900 may also map each group of tests 1022, 1024, 1026, and 1028 to a different computing environment of testing server 904 for testing source code updates. For example, manual tests 1028 may be executed in an environment that approximates, in some cases exactly, the computing environment of an end-user of the software product. On the other hand, unit tests 1022 may be executed in a computational environment that might not resemble the end-user's computational environment but provides computational resources for execution of unit tests 1022. Mapped integration tests 1024 and 1026 may be executed in computational environments that get progressively closer to the end-user's expected computational environment. Additionally, some tests may utilize particular libraries or databases and may thus need to be executed in a computing environment that provides access to such resources.

Development application 900 may be configured to provide a centralized portal through which aspects of product development cycle 1000, content management system 902, and testing server 904 may be managed. To that end, development application 900 may provide for modification of the source code, generation of new branches, and generation of requests to merge branches together to move a source code update through development cycle 1000. Development application 900 may also be configured to determine the dependencies among code units and data units and collect performance data on the different software tests, as discussed with respect to FIGS. 6A-8B. Development application 900 may further provide for selection of target performance parameters corresponding to each checkpoint that determine the software tests selected for testing of source code updates at each checkpoint. As a result, development application 900 may automate testing of a source code update at the different checkpoints of development cycle 1000.

Figure 11:
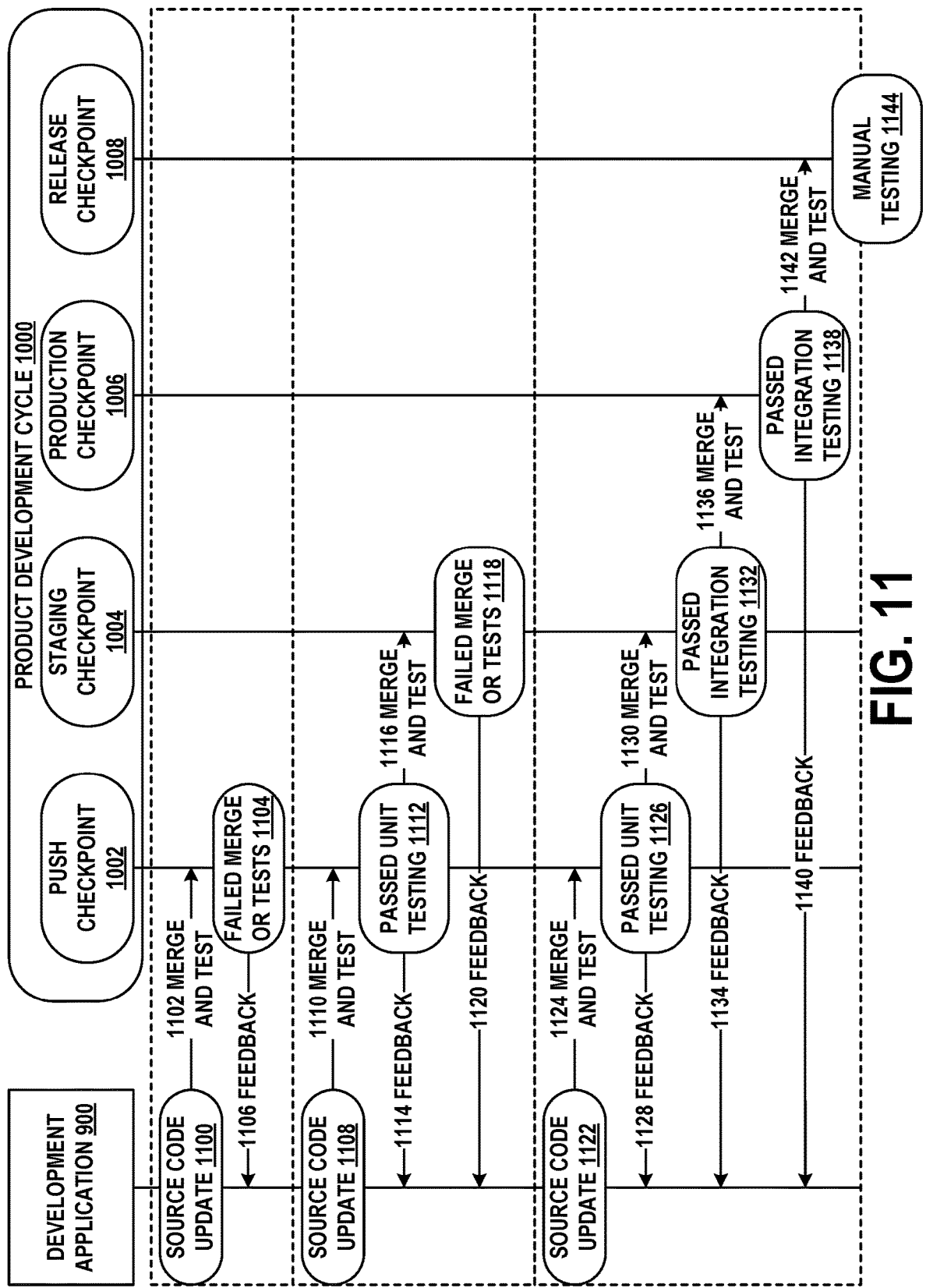
FIG. 11 illustrates a software development cycle, in accordance with example embodiments.

FIG. 11 illustrates development application 900 progressing a source code update through development cycle 1000. In doing so, development application 900 communicates with content management system 902 and testing server 904 and carries out the operations discussed with respect to FIGS. 9 and 10. Namely, development application 900 may be used to generate a source code update, as indicated by block 1100. Development application 900 may then be used to generate and transmit a request to merge the source code update with development branch 1012 at push checkpoint 1002, as indicated by arrow 1102. Development application 900 may also select unit tests 1022 to be used to evaluate development branch 1012 as updated by the source code update and transmit a request for execution of unit tests 1022 to testing server 904, as further indicated by arrow 1102. Notably, development application 900 may select unit tests 1022 automatically, according to the mapping shown in FIG. 10, based on or in response to a request to merge the source code update into development branch 1012 rather than another branch.

If the source code update fails to merge with development branch 1012, development branch 1012 fails to build, or development branch 1012 does not pass at least a threshold number of unit tests 1022, as indicated by block 1104, corresponding feedback may be transmitted back to development application 900, as indicated by arrow 1106. Development application 900 may maintain the source code update at push checkpoint 1002 of development cycle 1000 and may be used to resolve any flaws in the source code update identified by the feedback. In this way, development application 900 may provide a negative feedback system in development cycle 1000.

The flaws may be resolved by generating another source code update, as indicated by block 1108. Again, a request to merge the source code update with development branch 1012 may be transmitted to content management system 902, as indicated by arrow 1110. If the source code update successfully merges with development branch 1012 and development branch 1012 passes at least a threshold number of unit tests 1022, feedback may be transmitted to development application 900, as indicated by arrow 1114. In response to or based on this feedback, development application 900 may proceed to carry out operations associated with staging checkpoint 1004. In this way, development application 900 may provide a positive feedback system in development cycle 1000.

Namely, development application 900 may transmit a request to merge development branch 1012 (which now contains therein the source code update) with staging branch 1014 and execute mapped integration tests 1024 thereon, as indicated by arrow 1116. In some implementations, this request may be generated in response to instructions provided by the developer based on the feedback received at arrow 1114. Alternatively, this request may be generated by development application 900 automatically (e.g., in response to at least a threshold number of the software tests passing at block 1112). Development application 900 may automatically select mapped integration tests 1024 based on (i) the request at arrow 1116 corresponding to staging checkpoint 1004 and (ii) the portions of staging branch 1014 modified by the source code update.

If development branch 1012 fails to merge with staging branch 1014, staging branch 1014 fails to build, or staging branch 1014 does not pass at least a threshold number of mapped integration tests 1024, as indicated by block 1118, corresponding feedback may be transmitted back to development application 900, as indicated by arrow 1120. Development application 900 may then be used to resolve any flaws in the source code update identified by the feedback and may revert the source code update back to push checkpoint 1002 of development cycle 1000.

The flaws may be resolved by generating a further source code update, as indicated by block 1122. Again, a request to merge the source code update with development branch 1012 may be transmitted to content management system 902, as indicated by arrow 1124. If the source code update successfully merges with development branch 1012 and development branch 1012 passes unit tests 1022, as indicated by block 1126, feedback may be transmitted to development application 900, as indicated by arrow 1128. In response to or based on this feedback, development application 900 may proceed to carry out operations associated with staging checkpoint 1004. Again, in this way, development application 900 may provide a positive feedback system in development cycle 1000.

Again, development application 900 may transmit a request to merge development branch 1012 (which now contains therein the source code update) with staging branch 1014 and execute mapped integration tests 1024 thereon, as indicated by arrow 1130. If development branch 1012 successfully merges with staging branch 1014 and staging branch 1014 passes at least a threshold number of mapped integration tests 1024, as indicated by block 1132, feedback may be transmitted to development application 900, as indicated by arrow 1134. In response to or based on this feedback, development application 900 may proceed to carry out operations associated with production checkpoint 1006.

Namely, development application 900 may transmit a request to merge staging branch 1014 (which now contains therein the source code update) with production branch 1016 and execute comprehensive integration tests 1026 thereon, as indicated by arrow 1136. If staging branch 1014 fails to merge with production branch 1016, production branch 1016 fails to build, or if production branch 1016 does not pass at least a threshold number of comprehensive integration tests 1026, corresponding feedback may be generate and the process of source code revision and testing may again be repeated.

On the other hand, if staging branch 1014 merges with production branch 1016 and production branch 1016 passes at least the threshold number of comprehensive integration tests 1026, as indicated by block 1138, feedback may be transmitted to development application 900, as indicated by arrow 1140. In response to or based on this feedback, development application 900 may proceed to carry out operations associated with release checkpoint 1008.

Namely, development application 900 may transmit a request to merge production branch 1016 (which now contains therein the source code update) with release branch 1018, as indicated by arrow 1142. Release branch 1018 may be subject to manual testing by one or more developers or other users of the software product, as indicated by block 1144. In some implementations, development application 900 may be configured to determine and provide manual tests 1028 as suggestions to the users of the software product. Manual tests 1028 may be determined by development application 900 based on the portions of release branch 1018 modified by the source code update. For example, a manual tester may be instructed to use or interact with aspects of a user interface of the software product that are mapped to, invoke, or are otherwise related to code units modified by the source code update.

As the process illustrated in FIGS. 9-11 is repeated by a particular developer, development application 900 may compile performance metrics for the particular developer. For example, development application 900 may track the number of tests passed and/or the number of tests failed by source code updates generated by the particular developer, the number of revisions needed for a source code update generated by the particular developer to pass from push checkpoint 1002 to release checkpoint 1008, and/or the frequency with which the particular developer's source code updates conflict with source code updates generated by other developers, among other possible performance metrics. Developers may use such performance metrics to identify areas for improvement and determine relative performance within a team, among other functions.

Development application 900 may additionally provide for other customizable parameters to be mapped to the different checkpoints in development cycle 1000. For example, development application 900 may be used to define a minimum number of manual code reviewers (e.g., other software developers) by which a source code update is to be reviewed at a given checkpoint before progressing onto a subsequent checkpoint within development cycle 1000. For example, a source code update that passes at least the threshold number of unit tests 1022 may need to be manually reviewed by at least one other developer before progressing onto staging checkpoint 1004. Development application 900 may be configured to automatically submit the source code update for review by the manual reviewer and allow the source code update to proceed onto staging checkpoint 1004 when the reviewer approves the source code update, without additional input by the developer.

VII. Example Operations

Figure 12:
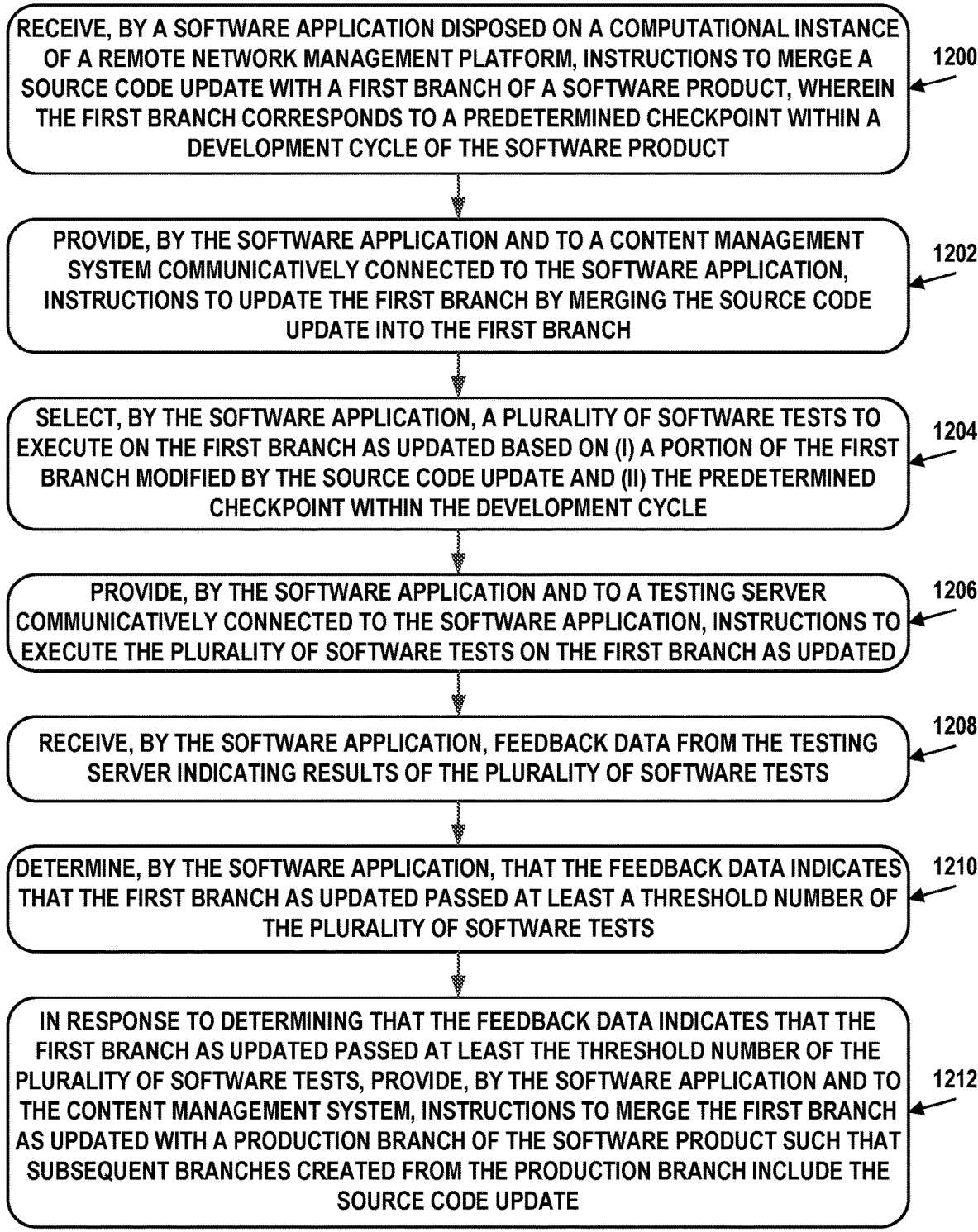
FIG. 12 is a flow chart, in accordance with example embodiments.

FIG. 12 is a flow chart illustrating an example embodiment. The process illustrated by FIG. 12 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 12 may be simplified by the removal of any one or more of the features shown therein. Further, these embodiments may be combined with features, aspects, and/or implementations of any of the previous figures or otherwise described herein.

Block 1200 may involve receiving, by a software application disposed on a computational instance of a remote network management platform, instructions to merge a source code update with a first branch of a software product. The first branch may correspond to a predetermined checkpoint within a development cycle of the software product.

Block 1202 may involve providing, by the software application and to a content management system communicatively connected to the software application, instructions to update the first branch by merging the source code update into the first branch. The software application may be communicatively connected to the content management system.

Block 1204 may involve selecting, by the software application, a plurality of software tests to execute on the first branch as updated based on (i) a portion of the first branch modified by the source code update and (ii) the predetermined checkpoint within the development cycle.

Block 1206 may involve providing, by the software application and to a testing server communicatively connected to the software application, instructions to execute the plurality of software tests on the first branch as updated.

Block 1208 may involve receiving, by the software application, feedback data from the testing server indicating results of the plurality of software tests.

Block 1210 may involve determining, by the software application, that the feedback data indicates that the first branch as updated passed at least a threshold number of the plurality of software tests.

Block 1212 may involve, in response to determining that the feedback data indicates that the first branch as updated passed at least the threshold number of the plurality of software tests, providing, by the software application and to the content management system, instructions to merge the first branch as updated with a production branch of the software product such that subsequent branches created from the production branch include the source code update.

In some embodiments, the first branch may be a development branch corresponding to a push checkpoint at which the source code update is transmitted from a software development environment provided by the remote network management platform to the content management system. The selected plurality of software tests may include unit tests configured to evaluate performance of a code unit of the software product, where the code unit includes therein the source code update.

In some embodiments, the first branch may be a staging branch corresponding to a staging checkpoint at which a development branch containing the source code update is requested to be merged with the production branch. The selected plurality of software tests may include integration tests configured to evaluate performance of (i) code units of the software product that include therein the source code update and (ii) further code units of the software product that invoke the code units. The selected plurality of software tests may also include integration tests configured to evaluate performance of additional code units of the software product that are invoked by the code units.

In some embodiments, the plurality of software tests may be a first plurality of software tests. In response to merging the first branch as updated with the production branch, the software application may be configured to select a second plurality of software tests to execute on the production branch as merged with the first branch. The second plurality of software tests may contain more software tests than the first plurality of software tests. The software application may be configured to provide instructions to the testing server to execute the second plurality of software tests on the production branch as merged with the first branch.

In some embodiments, the software application may be configured to receive additional feedback data from the testing server indicating results of the second plurality of software tests. The software application may also be configured to determine that the additional feedback data indicates that the production branch as merged with the first branch passed at least a second threshold number of the second plurality of software tests. The software application may be further configured to, in response to determining that the additional feedback data indicates that the production branch as merged with the first branch passed at least the second threshold number of the second plurality of software tests, provide instructions to release the production branch as merged with the first branch for manual testing.

In some embodiments, the software application may be configured to receive, from the testing server, additional feedback data indicating results of a plurality of additional software tests executed on a plurality of additional branches containing additional source code updates generated by a particular developer. The software application may also be configured to, based on the additional feedback data, generate performance metrics indicating a performance of the particular developer in generating the additional source code updates.

In some embodiments, the software application may be configured to receive an indication of a minimum number of code reviewers by which the source code update is to be reviewed. The software application may also be configured to provide the instructions to update the first branch by merging the source code update into the first branch in response to at least the minimum number of code reviewers approving the source code update.

In some embodiments, the software application may be configured to select the plurality of software tests to execute on the first branch as updated further based on target performance parameters. The target performance parameters may include one or more of (i) a maximum execution time of the plurality of software tests, (ii) a target code coverage of the first branch by the plurality of software tests, (iii) an extent of parallelizability of the plurality of software tests, or (iv) an extent of usage of computational resources of the testing server. Each checkpoint within the development cycle may be associated with different values for the target performance parameters.

In some embodiments, providing instructions to the testing server to execute the plurality of software tests on the first branch as updated may involve providing, to the content management system, instructions configured to cause the content management system to, in response to merging the source code update into the first branch, transmit, to the testing server, instructions configured to cause the testing server to execute the plurality of software tests on the first branch as updated.

In some embodiments, the testing server may be configured to provide a plurality of different computational environments. Providing instructions to the testing server to execute the plurality of software tests on the first branch as updated may involve selecting, based on the predetermined checkpoint within the development cycle, a particular computational environment of the plurality of different computational environments within which to execute the plurality of software tests and providing instructions to the testing server to execute the plurality of software tests on the first branch within the particular computational environment.

In some embodiments, providing the instructions to the testing server to execute the plurality of software tests on the first branch as updated may involve determining, based on the portion of the first branch modified by the source code update, a subset of the software product to rebuild to incorporate the source code update into an updated executable version of the software product. The testing server may be provided with instructions to (i) rebuild the subset of the software product and (ii) execute the plurality of software tests on the updated executable version of the software product.

In some embodiments, determining the subset of the software product to rebuild may involve determining dependencies between code units and data units that make up the software product. Based on the dependencies, the software application may be configured to determine (i) a first group of the code units that depend on a code unit containing the source code update and (ii) a second group of the data units that depend on the code unit. The software application may also be configured to determine the subset of the software product to rebuild based on the first group of the code units and the second group of the data units.

In some embodiments, the testing server and the content management system may each be disposed on a corresponding computational instance of the remote network management platform.

In some embodiments, the software product may be a release version of software that forms part of computational instances of the remote network management platform.

VIII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising a memory and a processor, wherein the processor is configured to execute a software application disposed on a computational instance of a remote network management platform, wherein the software application is communicatively connected to (i) a testing server and (ii) a content management system, and wherein the memory stores instructions that when executed by the processor, cause the computing system to:
    receive instructions to merge a source code update with a first branch of a software product, wherein the first branch corresponds to a predetermined checkpoint within a development cycle of the software product;
    provide, to the content management system, instructions to update the first branch by merging the source code update into the first branch;
    select a plurality of software tests to execute on the first branch as updated based on (i) a portion of the first branch modified by the source code update and (ii) the predetermined checkpoint within the development cycle;
    provide instructions to the testing server to execute the plurality of software tests on the first branch as updated;
    receive feedback data from the testing server indicating results of the plurality of software tests;
    determine that the feedback data indicates that the first branch as updated passed at least a threshold number of the plurality of software tests; and
    in response to determining that the feedback data indicates that the first branch as updated passed at least the threshold number of the plurality of software tests, provide, to the content management system, instructions to merge the first branch as updated with a production branch of the software product such that subsequent branches created from the production branch include the source code update.

2. The computing system of claim 1, wherein the first branch is a development branch corresponding to a push checkpoint at which the source code update is transmitted from a software development environment provided by the remote network management platform to the content management system, and wherein the selected plurality of software tests comprises unit tests configured to evaluate performance of a code unit of the software product, wherein the code unit includes therein the source code update.

3. The computing system of claim 1, wherein the first branch is a staging branch corresponding to a staging checkpoint at which a development branch containing the source code update is requested to be merged with the production branch, and wherein the selected plurality of software tests comprises integration tests configured to evaluate performance of (i) code units of the software product that include therein the source code update and (ii) further code units of the software product that invoke the code units.

4. The computing system of claim 1, wherein the plurality of software tests is a first plurality of software tests, and wherein the software application is further configured to:
    in response to merging the first branch as updated with the production branch, select a second plurality of software tests to execute on the production branch as merged with the first branch, wherein the second plurality of software tests contains more software tests than the first plurality of software tests; and
    provide instructions to the testing server to execute the second plurality of software tests on the production branch as merged with the first branch.

5. The computing system of claim 4, wherein the instructions, when executed by the processor, cause the computing system to:
    receive additional feedback data from the testing server indicating results of the second plurality of software tests;
    determine that the additional feedback data indicates that the production branch as merged with the first branch passed at least a second threshold number of the second plurality of software tests; and
    in response to determining that the additional feedback data indicates that the production branch as merged with the first branch passed at least the second threshold number of the second plurality of software tests, provide instructions to release the production branch as merged with the first branch for manual testing.

6. The computing system of claim 1, wherein the instructions, when executed by the processor, cause the computing system to:
    receive, from the testing server, additional feedback data indicating results of a plurality of additional software tests executed on a plurality of additional branches containing additional source code updates generated by a particular developer; and
    based on the additional feedback data, generate performance metrics indicating a performance of the particular developer in generating the additional source code updates.

7. The computing system of claim 1, wherein the instructions, when executed by the processor, cause the computing system to:
    receive an indication of a minimum number of code reviewers by which the source code update is to be reviewed; and
    provide the instructions to update the first branch by merging the source code update into the first branch in response to at least the minimum number of code reviewers approving the source code update.

8. The computing system of claim 1, wherein the instructions, when executed by the processor, cause the computing system to select the plurality of software tests to execute on the first branch as updated further based on target performance parameters, wherein the target performance parameters comprise one or more of (i) a maximum execution time of the plurality of software tests, (ii) a target code coverage of the first branch by the plurality of software tests, (iii) an extent of parallelizability of the plurality of software tests, or (iv) an extent of usage of computational resources of the testing server, wherein each checkpoint within the development cycle is associated with different values for the target performance parameters.

9. The computing system of claim 1, wherein the instructions, when executed by the processor, cause the computing system to provide instructions to the testing server to execute the plurality of software tests on the first branch as updated by:
providing, to the content management system, instructions configured to cause the content management system to, in response to merging the source code update into the first branch, transmit, to the testing server, instructions configured to cause the testing server to execute the plurality of software tests on the first branch as updated.

10. The computing system of claim 1, wherein the testing server is configured to provide a plurality of different computational environments, and wherein the software application is configured to provide instructions to the testing server to execute the plurality of software tests on the first branch as updated by:
selecting, based on the predetermined checkpoint within the development cycle, a particular computational environment of the plurality of different computational environments within which to execute the plurality of software tests; and
providing instructions to the testing server to execute the plurality of software tests on the first branch within the particular computational environment.

11. The computing system of claim 1, wherein the instructions, when executed by the processor, cause the computing system to provide the instructions to the testing server to execute the plurality of software tests on the first branch as updated by:
determining, based on the portion of the first branch modified by the source code update, a subset of the software product to rebuild to incorporate the source code update into an updated executable version of the software product; and
providing, to the testing server, instructions to (i) rebuild the subset of the software product and (ii) execute the plurality of software tests on the updated executable version of the software product.

12. The computing system of claim 11, wherein the instructions, when executed by the processor, cause the computing system to determine the subset of the software product to rebuild by:
determining dependencies between code units and data units that make up the software product;
based on the dependencies, determining (i) a first group of the code units that depend on a code unit containing the source code update and (ii) a second group of the data units that depend on the code unit; and
determine the subset of the software product to rebuild based on the first group of the code units and the second group of the data units.

13. The computing system of claim 1, wherein the testing server and the content management system are each disposed on a corresponding computational instance of the remote network management platform.

14. The computing system of claim 1, wherein the software product is a release version of software that forms part of computational instances of the remote network management platform.

15. A method comprising:
receiving, by a processor executing a software application disposed on a computational instance of a remote network management platform, instructions to merge a source code update with a first branch of a software product, wherein the first branch corresponds to a predetermined checkpoint within a development cycle of the software product;
providing, by the processor executing the software application and to a content management system communicatively connected to the software application, instructions to update the first branch by merging the source code update into the first branch;
selecting, by the processor executing the software application, a plurality of software tests to execute on the first branch as updated based on (i) a portion of the first branch modified by the source code update and (ii) the predetermined checkpoint within the development cycle;
providing, by the processor executing the software application and to a testing server communicatively connected to the software application, instructions to execute the plurality of software tests on the first branch as updated;
receiving, by the processor executing the software application, feedback data from the testing server indicating results of the plurality of software tests;
determining, by the processor executing the software application, that the feedback data indicates that the first branch as updated passed at least a threshold number of the plurality of software tests; and
in response to determining that the feedback data indicates that the first branch as updated passed at least the threshold number of the plurality of software tests, providing, by the processor executing the software application and to the content management system, instructions to merge the first branch as updated with a production branch of the software product such that subsequent branches created from the production branch include the source code update.

16. The method of claim 15, wherein the first branch is a development branch corresponding to a push checkpoint at which the source code update is transmitted from a software development environment provided by the remote network management platform to the content management system, and wherein the selected plurality of software tests comprises unit tests configured to evaluate performance of a code unit of the software product, wherein the code unit includes therein the source code update.

17. The method of claim 15, wherein the first branch is a staging branch corresponding to a staging checkpoint at which a development branch containing the source code update is requested to be merged with the production branch, and wherein the selected plurality of software tests comprises integration tests configured to evaluate performance of (i) code units of the software product that include therein the source code update and (ii) further code units of the software product that invoke the code units.

18. The method of claim 15, wherein providing the instructions to the testing server to execute the plurality of software tests on the first branch as updated comprises:
   determining, based on the portion of the first branch modified by the source code update, a subset of the software product to rebuild to incorporate the source code update into an updated executable version of the software product; and
   providing, to the testing server, instructions to (i) rebuild the subset of the software product and (ii) execute the plurality of software tests on the updated executable version of the software product.

19. An article of manufacture including a non-transitory computer-readable medium, having stored thereon program instructions that, upon execution by a computing system, cause the computing system to perform operations comprising:
   receiving instructions to merge a source code update with a first branch of a software product, wherein the first branch corresponds to a predetermined checkpoint within a development cycle of the software product;
   providing, to a content management system communicatively connected to the computing system, instructions to update the first branch by merging the source code update into the first branch;
   selecting a plurality of software tests to execute on the first branch as updated based on (i) a portion of the first branch modified by the source code update and (ii) the predetermined checkpoint within the development cycle;
   providing, to a testing server communicatively connected to the computing system, instructions to execute the plurality of software tests on the first branch as updated;
   receiving feedback data from the testing server indicating results of the plurality of software tests;
   determining that the feedback data indicates that the first branch as updated passed at least a threshold number of the plurality of software tests; and
   in response to determining that the feedback data indicates that the first branch as updated passed at least the threshold number of the plurality of software tests, providing, to the content management system, instructions to merge the first branch as updated with a production branch of the software product such that subsequent branches created from the production branch include the source code update.

20. The article of manufacture of claim 19, wherein the testing server is configured to provide a plurality of different computational environments, and wherein providing instructions to the testing server to execute the plurality of software tests on the first branch as updated comprises:
   selecting, based on the predetermined checkpoint within the development cycle, a particular computational environment of the plurality of different computational environments within which to execute the plurality of software tests; and
   providing instructions to the testing server to execute the plurality of software tests on the first branch within the particular computational environment.

* * * * *